(12) United States Patent
Wetzler et al.

(10) Patent No.: US 10,062,171 B2
(45) Date of Patent: Aug. 28, 2018

(54) 3D RECONSTRUCTION FROM PHOTOMETRIC STEREO WITH SHADOWS

(71) Applicant: Technion Research & Development Foundation Limited, Haifa (IL)

(72) Inventors: Aaron Wetzler, Haifa (IL); Roberto Mecca, Haifa (IL); Ron Kimmel, Haifa (IL); Alfred M. Bruckstein, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 148 days.

(21) Appl. No.: 15/022,266

(22) PCT Filed: Sep. 10, 2014

(86) PCT No.: PCT/IL2014/050803
§ 371 (c)(1),
(2) Date: Mar. 16, 2016

(87) PCT Pub. No.: WO2015/036994
PCT Pub. Date: Mar. 19, 2015

(65) Prior Publication Data
US 2016/0284094 A1    Sep. 29, 2016

Related U.S. Application Data

(60) Provisional application No. 61/878,401, filed on Sep. 16, 2013.

(51) Int. Cl.
G06K 9/00 (2006.01)
G06T 7/00 (2017.01)
H04N 5/225 (2006.01)
G06T 7/586 (2017.01)

(52) U.S. Cl.
CPC .......... *G06T 7/0073* (2013.01); *G06T 7/586* (2017.01); *H04N 5/2256* (2013.01);
(Continued)

(58) Field of Classification Search
None
See application file for complete search history.

(56) References Cited

U.S. PATENT DOCUMENTS

2002/0139920 A1* 10/2002 Seibel .................. A61B 1/0008
                                                      250/208.1
2004/0076313 A1*  4/2004 Bronstein ........... G06K 9/00214
                                                      382/118
(Continued)

FOREIGN PATENT DOCUMENTS

WO    WO 2015/036994    3/2015

OTHER PUBLICATIONS

International Preliminary Report on Patentability dated Mar. 31, 2016 From the International Bureau of WIPO Re. Application No. PCT/IL2014/050803.
(Continued)

*Primary Examiner* — Sumati Lefkowitz
*Assistant Examiner* — David Perlman

(57) ABSTRACT

A method of processing a set of images of a scene is disclosed. The set is represented by a plurality of picture-elements defining an image plane, and the images are characterized by different light intensity spatial distributions but the same viewpoint relative to the scene. The method comprises: for each of at least some picture-elements, independently selecting a direction parallel to the image plane, constructing a weighted vector field based on the selected direction, and calculating a height of a surface in the scene perpendicular to the image plane based on the constructed weighted vector field. The method further comprises reconstructing a three-dimensional spatial representation of the surface based on the heights; and transmitting the spatial representation to a computer readable medium.

33 Claims, 13 Drawing Sheets
(3 of 13 Drawing Sheet(s) Filed in Color)

(52) U.S. Cl.
CPC ............... *G06T 2207/10068* (2013.01); *G06T 2207/10152* (2013.01); *H04N 2005/2255* (2013.01)

(56) References Cited

U.S. PATENT DOCUMENTS

| | | | | |
|---|---|---|---|---|
| 2004/0184648 | A1* | 9/2004 | Zhang | G06T 7/586 382/141 |
| 2011/0028183 | A1* | 2/2011 | Yun | G06T 7/586 455/556.1 |

OTHER PUBLICATIONS

International Search Report and the Written Opinion dated Jan. 22, 2015 From the International Searching Authority Re. Application No. PCT/IL2014/050803.

Collins et al. "3D Reconstruction in Laparoscopy With Close-Range Photometric Stereo", Medical Immage Computing and Computer-Assisted Intervention, MICCAI 2012, XP047018291, Part II, LNCS 7511: 634-642, Oct. 1, 2012. Sections 2, 2.1, 2.2.

Mecca et al. "Direct Shape Recovery From Photometric Stereo With Shadows", 2013 International Conference on 3D Vision, XP032480440, p. 382-389, Jun. 29, 2013.

Mecca et al. "Perspective Photometric Stereo With Shadows", Scale Space and Variation Methods in Computer Vision, SSVM 2013, XP047028978, LNCS 7893: 258-269, Jun. 2, 2013. Section 2, Equation (2).

Parot et al. "Photometric Stereo Endoscopy", Journal of Biomedical Optics, XP060024273, 18(7): 076017-1-076017-7, Published Online Jul. 17, 2013. Abstract.

Prados et al. "Shape From Shading: A Well-Posed Problem?", Proceedings 2005 IEEE Computer Society Conference on Computer Vision and Pattern Recognition, San Diego, CA, USA, Jun. 20-25, 2005, XP010817545, 2: 870-877, Jun. 20, 2005. Section 3.

\* cited by examiner

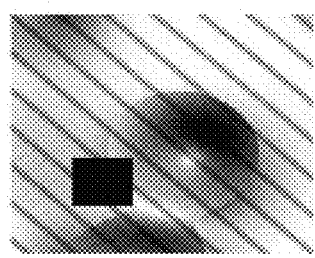 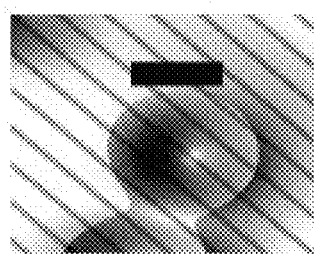 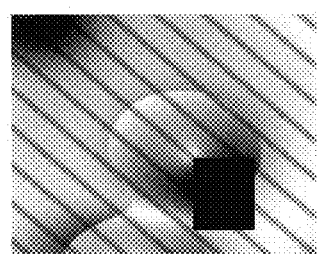
$I_1$  $I_2$  $I_3$
FIG. 9A  FIG. 9B  FIG. 9C
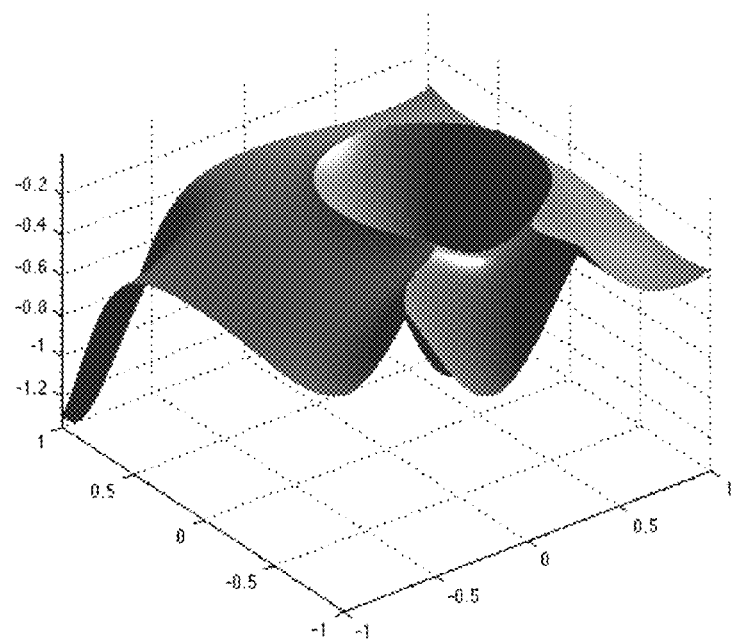
FIG. 10A

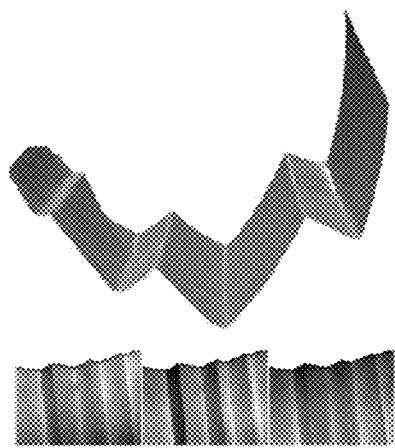
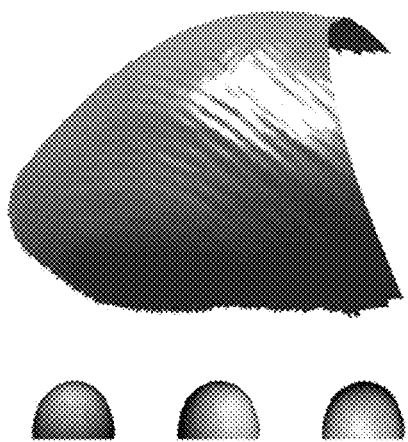
FIG. 18A  FIG. 18B
FIG. 18C

3D RECONSTRUCTION FROM PHOTOMETRIC STEREO WITH SHADOWS

RELATED APPLICATIONS

This application is a National Phase of PCT Patent Application No. PCT/IL2014/050803 having International filing date of Sep. 10, 2014, which claims the benefit of priority under 35 USC § 119(e) of U.S. Provisional Patent Application No. 61/878,401 filed Sep. 16, 2013. The contents of the above applications are all incorporated by reference as if fully set forth herein in their entirety.

FIELD AND BACKGROUND OF THE INVENTION

The present invention, in some embodiments thereof, relates to image processing and, more particularly, but not exclusively, to image processing based on photometric stereo.

Photometric stereo (PS) has been a powerful tool used for three-dimensional (3D) object acquisition techniques. Conventional PS methods estimate surface orientation by analyzing how a surface reflects light incident from multiple directions. Known PS methods are disclosed in S. Barsky and M. Petrou, Pattern Analysis and Machine Intelligence, IEEE Transactions on, 2003, 25(10):1239-1252; R. Mecca and J. D. Durou, 2011, In Image Analysis and Processing—ICIAP 2011—16th International Conference, Ravenna, Italy, pages 286-295; and R. Onn and A. M. Bruckstein, 1990, International Journal of Computer Vision, 5(1):105-113.

Traditionally, PS employs a two step process, wherein in a first step the direction of the normal vector to the surface is computed for the entire surface, and in a second step, the computed direction is used for calculating of the height of the surface.

SUMMARY OF THE INVENTION

According to an aspect of some embodiments of the present invention there is provided a method of processing a set of images of a scene. The set is represented by a plurality of picture-elements defining an image plane, and the images are characterized by different spatial intensity distributions but the same viewpoint relative to the scene. The method comprises: for each of at least some picture-elements, independently selecting a direction parallel to the image plane, constructing a weighted vector field based on the selected direction, and calculating a height of a surface in the scene perpendicular to the image plane based on the constructed weighted vector field. The method further comprises reconstructing a three-dimensional spatial representation of the surface based on the heights.

According to some embodiments of the invention the surface is partially obstructed in at least one image of the set, and wherein the selection of the direction comprises identifying a picture-element adjacent to an obstruction and selecting a tangential direction to the obstruction for the identified picture-element.

According to some embodiments of the invention the selection of direction comprises selecting a direction pointing from the picture-element to a neighbor picture-element that has not yet been visited by the method.

According to some embodiments of the invention construction of weighted vector field, comprises: calculating vectors for pairs of images of the set, thereby providing a set of candidate vectors; selecting from the set of candidate vectors a pair of vectors that are more orthogonal to each other than at least one other pair of candidate vectors; and calculating the weighted vector field based on the selected direction and based on the selected pair of vectors.

According to some embodiments of the invention the method comprises comparing the three-dimensional spatial representation to a reference spatial representation, and identifying the surface based on the comparison.

According to some embodiments of the invention the surface is a surface of a face of an individual.

According to an aspect of some embodiments of the present invention there is provided a method of imaging. The method comprises: successively illuminating a scene from a plurality of positions; acquiring, from the same viewpoint, at least one image of the scene at each illumination of the surface, thereby providing a set of images of a scene. The method further comprises analyzing the images by executing the method as described above and optionally as further detailed below.

According to some embodiments of the invention the set of images is a set of scenery images.

According to some embodiments of the invention the set of images is a set of endoscopic images.

According to an aspect of some embodiments of the present invention there is provided a method of inspecting a surface of an object. The method comprises imaging the surface of the object by executing the method described above and analyzing the three-dimensional spatial representation thereby inspecting the surface of the object.

According to an aspect of some embodiments of the present invention there is provided a computer software product for image processing. The computer software product comprises a non-volatile memory medium readable by a data processor. The memory medium stores program instructions, which, when read by the data processor, cause the data processor to receive a set of images and execute the method as described above and optionally as further detailed below.

According to an aspect of some embodiments of the present invention there is provided a system for imaging. The system comprises: an illumination system for illuminating a scene from a plurality of positions; an image sensor for acquiring, from the same viewpoint, at least one image of the scene at each illumination of the surface, thereby providing a set of images of a scene; and a data processor having an electronic circuit and a non-volatile memory medium readable by the circuit. The memory medium stores program instructions which, when read by the circuit, cause the circuit to receive the set of images and execute the method as described above and optionally as further detailed below.

According to some embodiments of the invention the illumination system and the image sensor are mounted on an endoscope.

According to an aspect of some embodiments of the present invention there is provided a portable device, comprising the imaging system as described above and optionally as further detailed below.

According to some embodiments of the invention the portable device is selected from the group consisting of a cellular phone, a smartphone, a tablet device, a mobile digital camera, a wearable camera, a portable media player, a portable gaming device, a portable digital assistant device, and a portable navigation device.

According to an aspect of some embodiments of the present invention there is provided a method of processing a set of endoscopic images of a scene, the set being represented by a plurality of picture-elements defining an image plane, the images being characterized by different light intensity spatial distributions but the same viewpoint relative to the scene. The method comprises: obtaining a depth of a location in the scene corresponding to a seed picture-element; for each picture-element of at least some picture-elements other than the seed picture-element, associating a depth to the picture-element, independently selecting a direction parallel to the image plane, constructing a weighted vector field based on the selected direction and the associated depth, and calculating a height of a surface in the scene perpendicular to the image plane based on the constructed weighted vector field. The method further comprises reconstructing a three-dimensional spatial representation of the surface based on the heights.

According to some embodiments of the invention the weighted vector field is calculated according to a parameterization which is non-linear with respect to the depth.

According to some embodiments of the invention the weighted vector field is calculated according to a parameterization which is reciprocally proportional to the depth.

According to some embodiments of the invention the method comprises correcting an intensity value of the picture-element for light attenuation.

According to some embodiments of the invention the correction comprises calculating a light attenuation coefficient, and multiplying the intensity value by the light attenuation coefficient.

According to some embodiments of the invention the correcting comprises calculating light attenuation due to distance traveled by light.

According to some embodiments of the invention the correction comprises calculating radial attenuation of light.

According to some embodiments of the invention the surface is partially obstructed in at least one image of the set, and wherein the selection of the direction comprises identifying a picture-element adjacent to an obstruction and selecting a tangential direction to the obstruction for the identified picture-element.

According to some embodiments of the invention the selection of the direction comprises selecting a direction pointing from the picture-element to a neighbor picture-element that has not yet been visited by the method.

According to some embodiments of the invention the weighted vector field is constructed by: calculating vectors for pairs of images of the set, thereby providing a set of candidate vectors; selecting from the set of candidate vectors a pair of vectors that are more orthogonal to each other than at least one other pair of candidate vectors; and calculating the weighted vector field based on the selected direction and based on the selected pair of vectors.

According to some embodiments of the invention the picture-element is selected dynamically along an expanding wavefront.

According to some embodiments of the invention the calculation of the height is according to a forward numerical scheme.

According to some embodiments of the invention the forward numerical scheme is a forward upwind scheme.

According to some embodiments of the invention the forward numerical scheme is a forward semi-Lagrange scheme.

According to some embodiments of the invention the method comprises constructing a three-dimensional map of the scene based on the spatial representation.

According to an aspect of some embodiments of the present invention there is provided a method of imaging. The method comprises: using an endoscope for successively illuminating a scene from a plurality of positions; acquiring, from the same viewpoint, at least one image of the scene at each illumination of the surface, thereby providing a set of images of a scene; and executing the method as delineated above and optionally as detailed below.

According to an aspect of some embodiments of the present invention there is provided a computer software product for image processing. The computer software product comprises a non-volatile memory medium readable by a data processor, the memory medium storing program instructions, which, when read by the data processor, cause the data processor to receive a set of images and execute the method as delineated above and optionally as detailed below.

According to an aspect of some embodiments of the present invention there is provided a system for imaging. The system comprises: an endoscope mounted with an illumination system configured for illuminating a scene from a plurality of positions, and an image sensor for acquiring, from the same viewpoint, at least one image of the scene at each illumination of the surface, thereby providing a set of images of a scene. The system further comprises a data processor having an electronic circuit and a non-volatile memory medium readable by the circuit, wherein the memory medium stores program instructions which, when read by the circuit, cause the circuit to receive the set of images and execute the method as delineated above and optionally as detailed below.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a schematic illustration showing illumination vectors and their components;

FIG. 2 is a flowchart diagram of a method suitable for processing a set of images of a scene according to some embodiments of the present invention;

FIG. 3 is a flowchart diagram of a procedure suitable for constructing a weighted vector field according to some embodiments of the present invention;

FIG. 4 is a flowchart diagram of a method suitable for imaging according to some embodiments of the present invention;

FIG. 5 is a schematic illustration of a system for imaging, according to some embodiments of the present invention;

FIG. 6 is a schematic illustration of a system for imaging, in embodiments of the invention in which an illumination system and an image sensor are mounted on an endoscope;

FIG. 7 is a schematic illustration showing a set of directions corresponding to a rectangular grid, according to some embodiments of the present invention;

FIG. 8 is a schematic illustration of a wavefront expansion procedure that can be employed according to some embodiments of the present invention.

Figure 10B:
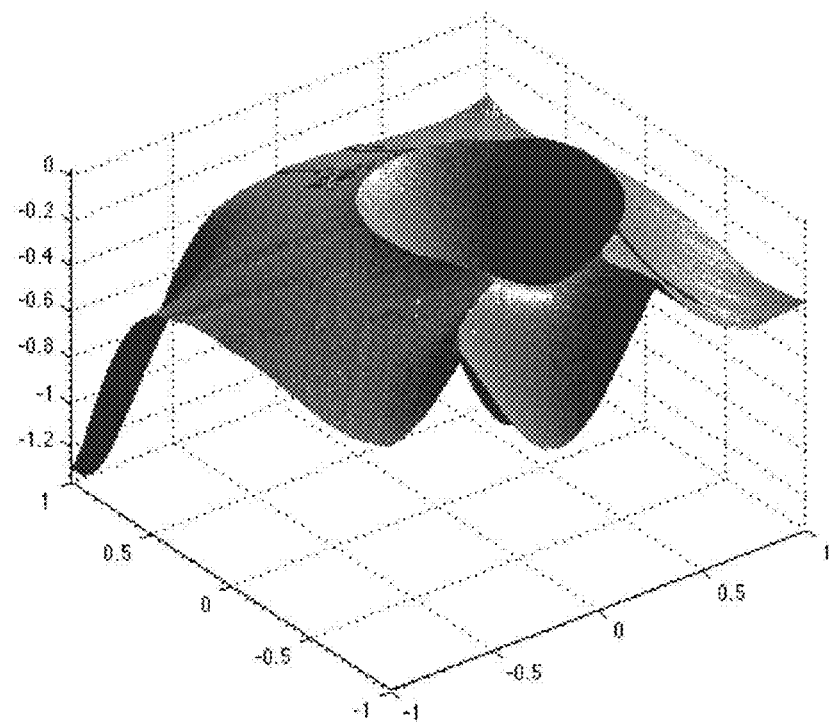
Figure 10C:
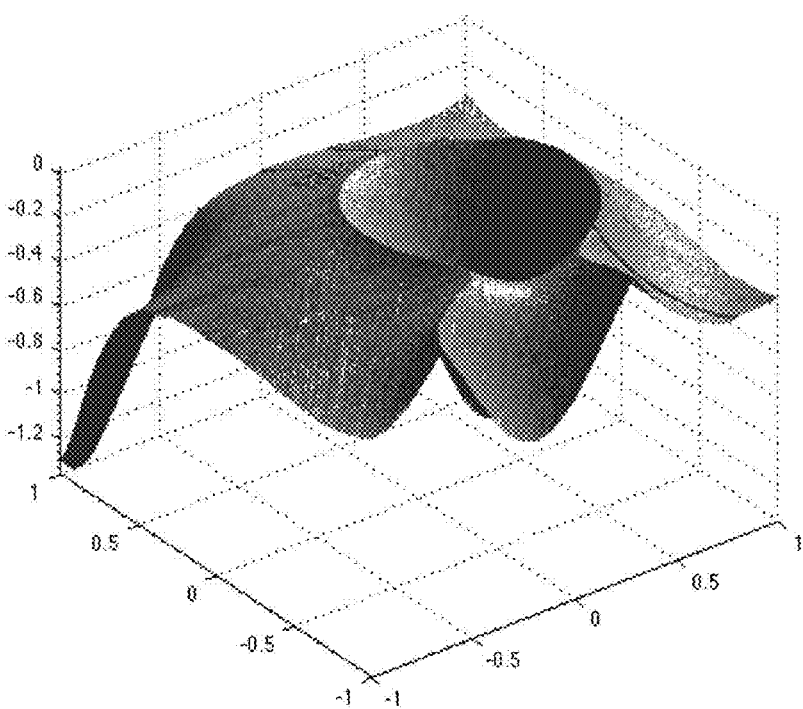

FIGS. 9A-C show initial images used in a synthetic image processing experiment performed according to some embodiments of the present invention;

FIGS. 10A-C show three-dimensional surfaces reconstructed according to some embodiments of the present invention from the images of FIGS. 9A-C, with different level of noise.

Figures 11A, 11B, 11C:
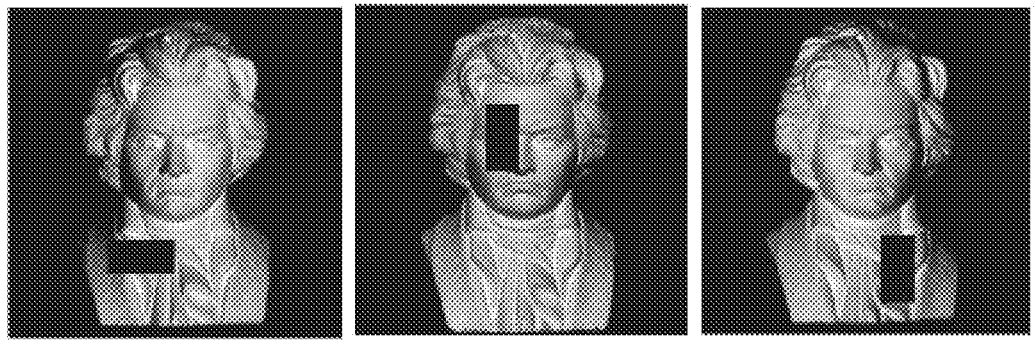
Figure 12:
Figures 13A, 13B, 13C:
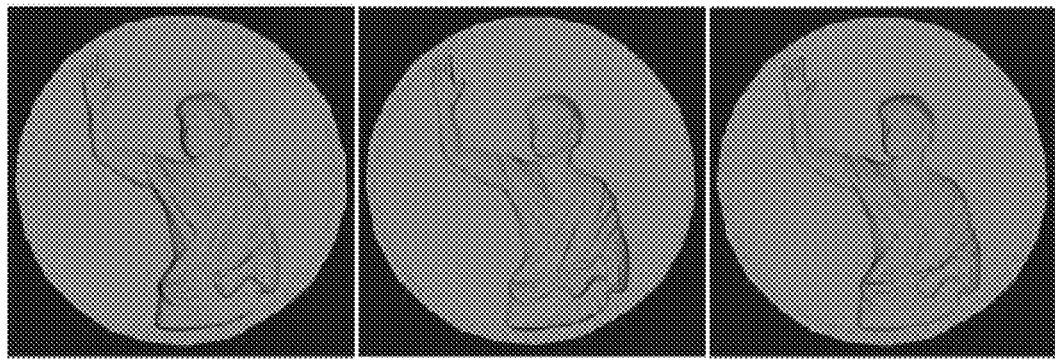
Figure 14:
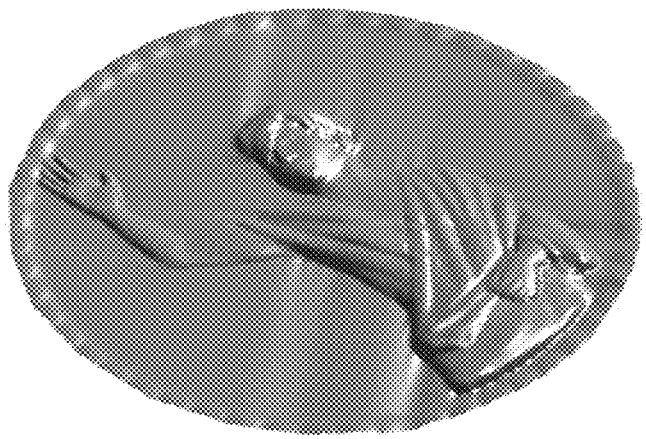
Figure 15:
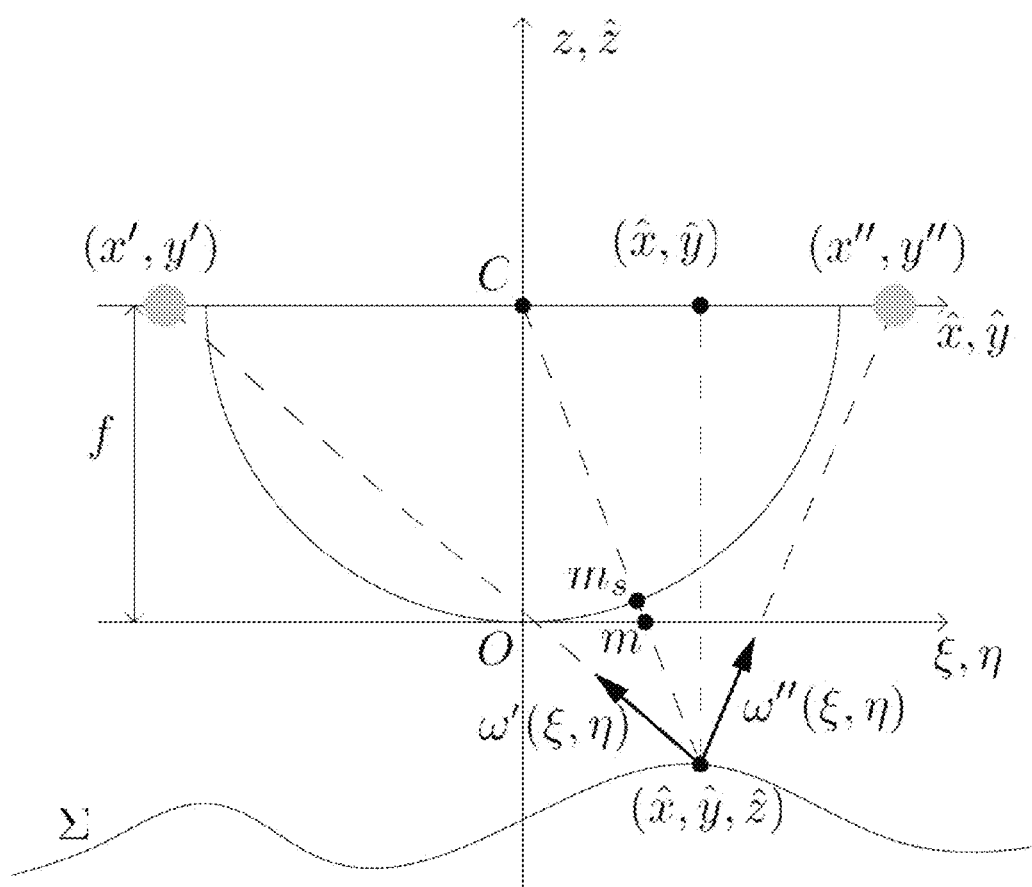
Figure 16:
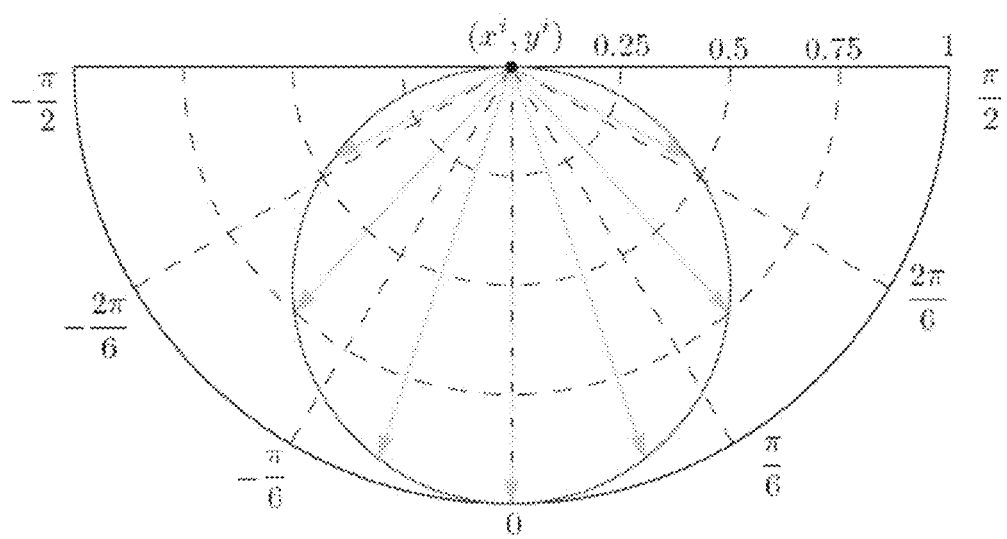

FIGS. 11A-C show a set of three real images of a bust with synthetic shadows, used in an image processing experiment performed according to some embodiments of the present invention;

FIG. 12 shows a surface as reconstructed according to some embodiments of the present invention from the images FIGS. 11A-C;

FIGS. 13A-C show a set of three synthetic images of a coin, used in an image processing experiment performed according to some embodiments of the present invention;

FIG. 14 shows a surface as reconstructed according to some embodiments of the present invention from the images FIGS. 13A-C;

FIG. 15 is a schematic illustration of realistic light propagation parameterization depending on the inspected surface, according to some embodiments of the present invention;

FIG. 16 is a schematic illustration showing angular attenuation of light intensity for a directional light source;

FIGS. 17A-L show synthetic images and corresponding three-dimensional reconstructions obtained during experiments performed according to some embodiments of the present invention; and FIGS. 18A-C show three-dimensional surface reconstructions of artificial stairs (FIG. 18A), a tip of a thumb (FIG. 18B), and a palm of a hand (FIG. 18C), obtained during experiments performed according to some embodiments of the present invention.

DESCRIPTION OF SPECIFIC EMBODIMENTS OF THE INVENTION

The present invention, in some embodiments thereof, relates to image processing and, more particularly, but not exclusively, to image processing based on photometric stereo.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Photometric stereo typically involves the reconstruction of a non-planar surface, which can be conveniently parameterized as $h(x, y)=(x, y, z(x, y))$, where x and y are coordinates over a two-dimensional domain $\overline{\Omega}$ (e.g., Cartesian coordinates) and $z(x, y)$ is a distance from $\overline{\Omega}$. Thus, a point $(x, y, z(x, y))$ is outside $\overline{\Omega}$ when $z \neq 0$ and in $\overline{\Omega}$ when $z=0$. The boundary of $\overline{\Omega}$ is denoted $\partial\Omega$ and the interior of $\overline{\Omega}$ is denoted $\Omega$. In various exemplary embodiments of the invention $\overline{\Omega}$ is a planar, e.g., a portion of a plane. In these embodiments $z(x,y)$ denotes a height above or below the plane.

Some embodiments of the present invention relate to the determination of an approximation of $z(x, y)$ of one or more objects from image data of a scene containing the object(s). The image data is optionally and preferably in the form of a set of images of a scene taken at different light conditions (e.g., different illumination angles).

The present Inventors found that for at least some internal points in the domain (namely at least a portion of $\Omega$) a relation between the light intensity captured at the time of image acquisitions, the direction of the illumination and $z(x, y)$ can be written as:

$$\underline{b}(x,y) \cdot \underline{\nabla} z(x,y) = f(x,y), \quad \text{EQ. 1}$$

where $\underline{b}$ is a vector field in $\Omega$, $f$ is a scalar field in $\overline{\Omega}$ and $\underline{\nabla}z$ is a gradient of z.

Herein, underlined symbols represent vector quantities.

The term "vector" means, an ordered list or pair of numbers. Commonly, a vector's components relate to a coordinate system such as Cartesian coordinates or polar coordinates. A vector can be represented graphically as an arrow where the tail is the initial point and the head is the terminal point.

The term "vector field" means a collection of vectors, where each vector of the collection is associated with a spatial location.

The vector field $\underline{b}$ is typically calculated from the image data in a pairwise manner, wherein the acquired light intensities of one image of the pair is multiplied by a projection on the domain (e.g., the plane) of an illumination direction that corresponds to another image of the pair. Formally, denoting an image acquired while the scene is illuminated from a direction $\underline{\omega}'$ by $I_1(x,y)$, and an image acquired while the scene is illuminated from another direction $\underline{\omega}''$ by $I_2(x,y)$, the vector field $\underline{b}$ can be written as $\underline{b}=I_2(x,y)(\omega_1', \omega_2')-I_1(x,y)(\omega_1'', \omega_2'')$, where $(\omega_1', \omega_2')$ is the projection of $\underline{\omega}'$ on the domain and ($\omega_1''$, $\omega_2''$) is the projection of $\underline{\omega}''$ on the domain. Note that $\underline{b}$ lies in the domain. The vectors $\underline{\omega}'$ and $\underline{\omega}''$ are optionally and preferably normalized to unity.

The scalar field $f(x,y)$ is, typically, also calculated from the image data in a pairwise manner. For the scalar field, the acquired light intensities of one image of the pair is typically multiplied by a projection on a normal to the domain (e.g., normal to the plane) of an illumination direction that corresponds to another image of the pair. Formally, the scalar field $f$ can be written as $f=I_2(x,y) \omega_3' - I_1(x,y) \omega_3''$, where $\omega_3'$ is the projection of $\underline{\omega}'$ on the normal to the domain and $\omega_3''$ is the projection of $\underline{\omega}''$ on the normal to the domain.

Figure 1:
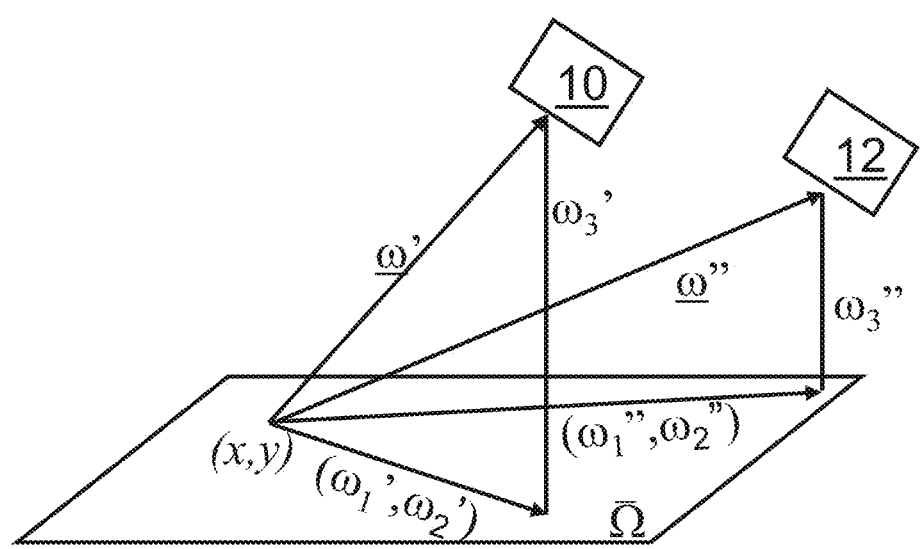

The vectors $\underline{\omega}'$ and $\underline{\omega}''$ as well as their projections on the domain and the normal to the domain are illustrated in FIG. 1. Shown in FIG. 1 is a planar domain $\overline{\Omega}$, and two light sources 10 and 12 at a distance from $\overline{\Omega}$. A point $(x,y)$ is marked on $\overline{\Omega}$. The vector $\underline{\omega}'$ is defined as pointing from $(x,y)$ to light source 10 and the vector $\underline{\omega}''$ is defined as pointing from $(x,y)$ to light source 12. The present embodiments contemplate use of more than two light sources. When additional light sources are employed, additional illumination vectors (e.g., $\underline{\omega}'''$, $\underline{\omega}^{(iv)}$, ...) can be similarly defined, wherein the ith vector points from $(x,y)$ to the ith light source.

A vector field and a scalar of the types defined above can be used for characterizing the response of the scene to the pair of illumination directions $\underline{\omega}'$ and $\underline{\omega}''$. Thus, a vector field of this type is referred to below as a characteristic vector field.

Any of the methods described herein can be embodied in many forms. For example, it can be embodied in on a tangible medium such as a computer for performing the method operations. It can be embodied on a computer readable medium, comprising computer readable instructions for carrying out the method operations. In can also be embodied in electronic device having digital computer capabilities arranged to run the computer program on the tangible medium or execute the instruction on a computer readable medium.

Computer programs implementing the method of the present embodiments can commonly be distributed to users on a distribution medium such as, but not limited to, CD-ROMs or flash memory media. From the distribution medium, the computer programs can be copied to a hard disk or a similar intermediate storage medium. In some embodiments of the present invention, computer programs implementing the method of the present embodiments can be distributed to users by allowing the user to download the programs from a remote location, via a communication network, e.g., the internet. The computer programs can be run by loading the computer instructions either from their distribution medium or their intermediate storage medium into the execution memory of the computer, configuring the computer to act in accordance with the method of this invention. All these operations are well-known to those skilled in the art of computer systems.

Figure 2:
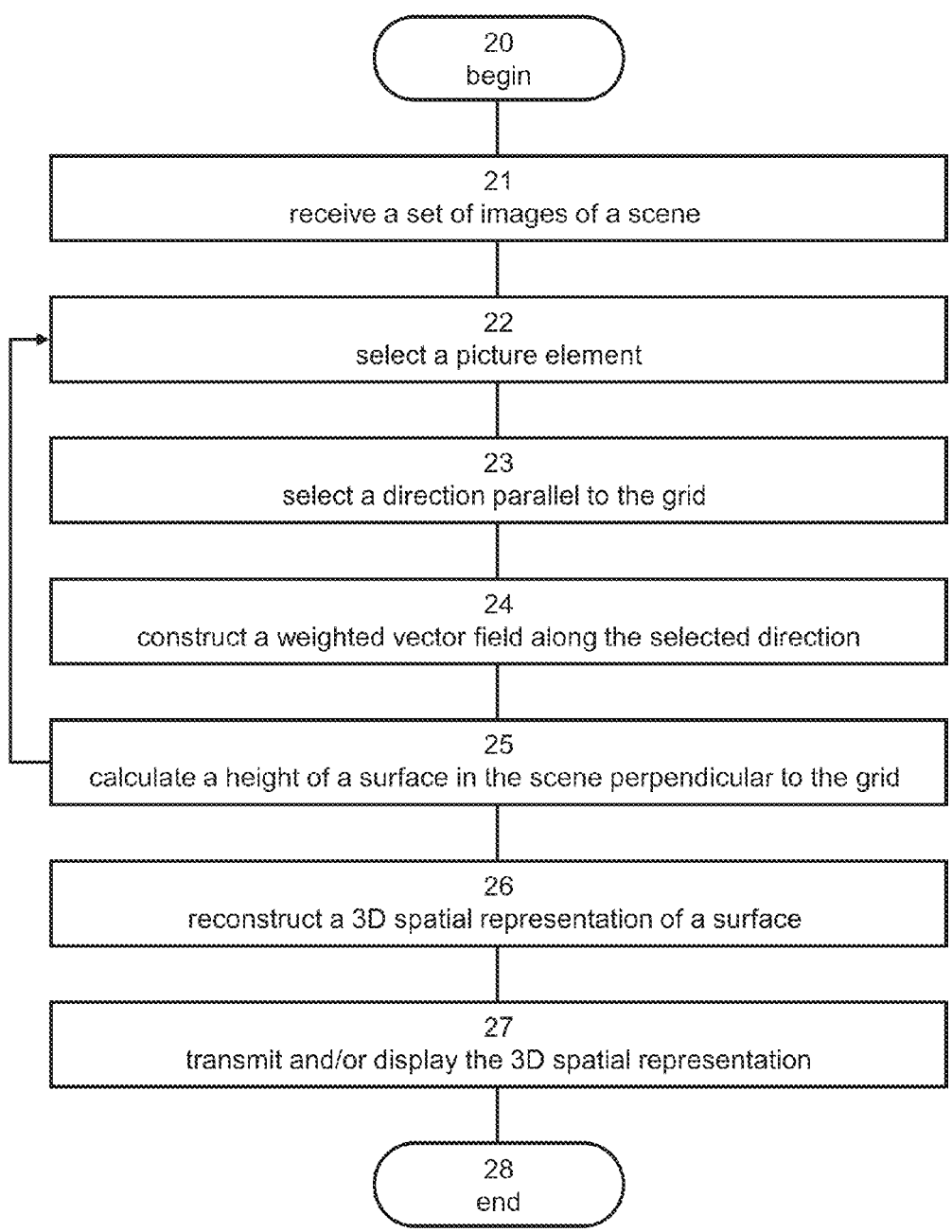

FIG. 2 is a flowchart diagram of a method suitable for processing a set of images of a scene according to some embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at 20 and continues to 21 at which a set of images of a scene is received. The set is preferably suitable for extracting three-dimensional spatial information by means of PS, as known in the art. Typically, but not necessarily, the images of the set are characterized by different spatial intensity distributions but the same viewpoint relative to the scene. The method preferably receives information pertaining to the different spatial intensity distributions together with the set of images. For example, the method can receive, for each image, a position, e.g., relative to the scene, of a light source that illuminates the scene.

The set of images is represented by a plurality of picture-elements (e.g., pixels, group of pixels) arranged gridwise over the domain $\partial\Omega \cup \Omega$, wherein the grid is a discretized form of the domain. For example, when the domain is planar, the picture-elements define a plane referred to herein as an image plane.

The term "pixel" is sometimes abbreviated herein to indicate a picture-element. However, this is not intended to limit the meaning of the term "picture-element" which refers to a unit of the composition of an image.

References to an "image" herein are, inter alia, references to values at pixels treated collectively as an array. Thus, the term "image" as used herein also encompasses a mathematical object which does not necessarily correspond to a physical object. The original and processed images certainly do correspond to physical objects which are the scene from which the imaging data are acquired.

Since the picture-elements are arranged over a grid, each picture-element corresponds to a spatial location over the grid. Therefore, a reference to a particular picture-element is equivalent to a reference to a particular location over the grid. In various exemplary embodiments of the invention all images of the set are registered over the same grid, so that each location over a grid is associated with a plurality of intensity values, corresponding to the different images of the set. For example, when the set comprises 3 grey scale images, each (discrete) location $(x,y)$ of the grid is associated with 3 grey levels, a first grey level that is stored in a pixel that is at location $(x,y)$ of the first image, a second grey level that is stored in a pixel that is at location $(x,y)$ of the second image, and a third grey level that is stored in a pixel that is at location $(x,y)$ of the third image.

Thus, without loss of generality, a picture-element $(x,y)$ can be associated with a plurality of intensity values ($I_1$, $I_2$, ...), wherein at least two intensity values correspond to different images of the set.

The number of images of the set is optionally and preferably 3 or more (e.g., 4 or 5 or 6 or more).

In what follows, the description of the method is directed to the data processing of an arbitrarily chosen picture-element located over the grid at a location referred to herein as location $(x,y)$. It is to be understood that the method operations are preferably repeated independently for most or all the picture-elements of the image.

Thus, the method continues to 22 at which picture-element $(x,y)$ is selected. The picture-element is optionally and preferably selected dynamically along an expanding wavefront. An expanding wavefront can be formed by processing picture-elements that are immediate neighbors to previously processed picture-elements.

As used herein, two picture-elements on a grid are referred to as "immediate neighbors" if there is no picture-element between them. For example, for a rectangular grid each picture-element has eight immediate neighbors: four nearest neighbors and four next-to-nearest neighbors.

The first processed picture-element is referred to a "seed" and is typically, but not necessarily, at, or close to, the center of the grid.

The method continues to 23 at which a direction $\underline{d}$ parallel to the image plane is selected. In various exemplary embodiments of the invention the selection of the direction $\underline{d}$ for the picture-element at (x,y) is independent of any direction that was previously selected for any picture-element at location other than (x,y). Such a selection of a direction is referred to herein as "independent selection of a direction."

Figure 7:
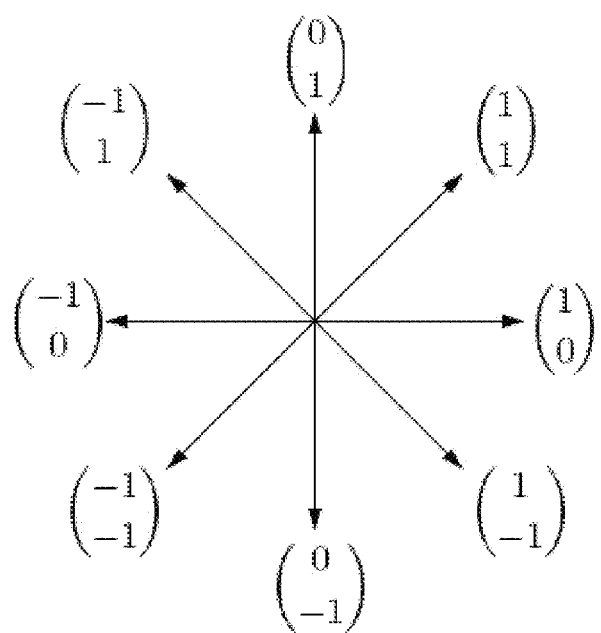

The direction $\underline{d}$ is optionally and preferably selected from a predetermined set of discrete directions. The set of discrete directions can be prepared based on the type of the grid and the number of immediate neighbors that the picture-element at (x,y) has. Typically, but not necessarily, the set of directions includes one direction for each neighbor picture-element, wherein the direction is defined from (x,y) to the neighbor picture-element. For example, for a rectangular grid, the set of directions can include eight different directions. A set of eight directions corresponding to a rectangular grid is illustrated in FIG. 7.

The independent selection of direction $\underline{d}$ is particularly useful when one or more of the images contains regions of shadows or other types of obstructions that do not allow light intensities to be acquired from parts of the object's surface. In these situations, the method identifies whether picture-element (x,y) is adjacent to an obstruction or shadow and selects direction d to be tangential to the obstruction.

The term "tangential" is used herein in the context of a discrete grid, and is therefore not necessarily set by calculating a derivative at a point. Rather, the tangential direction is a direction from (x,y) to an immediate neighbor picture-element under the constraint that the neighbor picture-element is not part of an obstructed or shadowed region.

Figure 8:
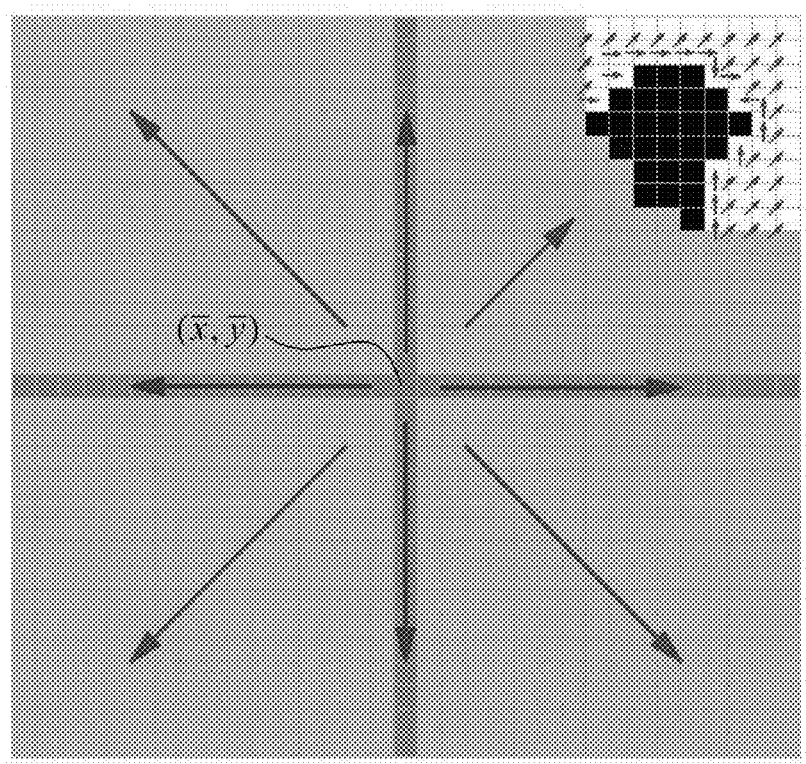

A representative of such selection of tangential direction is illustrated in FIG. 8. This illustration shows an obstructed or shadowed region (the dark region at the upper right corner of the grid). The selected directions are illustrated as small arrows surrounding the obstructed or shadowed region.

In various exemplary embodiments of the invention the direction d is selected so as not to point to a picture-element that has already been processed by the method. In these embodiments, the method optionally and preferably marks each picture-element that is visited for processing and the direction $\underline{d}$ is selected so as not to point to a picture-element that is not marked as processed. In various exemplary embodiments of the invention the direction $\underline{d}$ is a direction from (x,y) to a neighbor picture-element under the constraints that: (i) the immediate neighbor picture-element is not part of an obstructed or shadowed region, and (ii) the an immediate neighbor picture-element has not been previously processed by the method (for example, no direction has been selected for the immediate neighbor picture-element).

The method proceeds to 24 at which, a weighted vector $\underline{b}^w$ is constructed at (x,y) along, or approximately along (e.g., with deviation of less than 10°), the selected direction. Since the method eventually processes a plurality of picture-elements over the grid (e.g., all the picture-elements), the collection of weighted vectors $\underline{b}^w$ that are constructed for each processed picture-element forms a weighted vector field.

The terms "vector" and "vector field," are used herein interchangeably, where in the context of the entire grid the term "vector field" means a collection of vectors, one vector for each of at least some picture-elements over the grid, and in the context of a particular picture-element the term "vector field" means a single vector that corresponds to that particular picture-element and that is part of a collection of vectors.

The weighted vector field is optionally and preferably a linear combination of two or more characteristic vector fields. The vector field is "weighted" in the sense that each characteristic vector field in the linear combination is multiplied by a respective weight coefficient. Each characteristic vector field is optionally and preferably constructed from a different pair of images, wherein the acquired light intensities of one image of a particular pair is multiplied by a projection on the grid of an illumination direction that corresponds to another image of the particular pair.

Thus, for example, when the set of images comprises three images $I_1$, $I_2$ and $I_3$, the weighted vector field is optionally and preferably a linear combination of two or more characteristic vector fields, selected from the group consisting of a first characteristic vector field $b^{12}$ corresponding to the pair $\{I_1, I_2\}$, a second characteristic vector field $b^{13}$ corresponding to the pair $\{I_1, I_3\}$, and third characteristic vector field $b^{23}$ corresponding to the pair $\{I_2, I_3\}$. The weight coefficients of the characteristic vector fields in the linear combination are optionally and preferably selected such that the direction of the weighted vector field is along the direction selected at 23.

For example, when the weighted vector field $\underline{b}^w$ is constructed from two characteristic vector fields, e.g., $\underline{b}^{12}$ and $\underline{b}^{13}$, $\underline{b}^w$ can be written as $\underline{b}^w = \alpha \underline{b}^{12} + \beta \underline{b}^{13}$ where α and β are weight parameters that are calculated such that the combination $\alpha \underline{b}^{12} + \beta \underline{b}^{13}$ is along or approximately along the selected direction. Combination of more than two characteristic vector fields with more than two weight parameters is also contemplated. In situations and embodiments in which the direction is tangential to an obstructed or shadowed region, the weighted vector field has a null value at picture-elements in the obstruction. A more detailed description of a preferred procedure for calculating the weighted vector field is provided hereinbelow.

The method proceeds to 25 at which, based on the selected direction, a height of a surface in the scene, perpendicular to the image plane, is calculated. The calculation is optionally based, at least in part, on EQ. 1 above, with the proviso that $\underline{b}$ is replaced by the weighted vector field constructed at 24. The present inventors found that the height z(x,y) can be calculated without separately calculating the gradient $\underline{\nabla}z(x,y)$ prior to the calculation of the height. Such a calculation is referred to herein as a direct height calculation.

A direct height calculation can be performed by an iterative process that depends on the constructed weighted vector field. The iterative process can be according to any numerical scheme, including, without limitation, a forward numerical scheme (e.g., a forward upwind scheme, a forward semi-Lagrange scheme), and a backward numerical scheme (e.g., backward upwind scheme, a backward semi-Lagrange scheme).

From 25 the method optionally and preferably loops back to 22 at which another picture-element is selected for processing, e.g., according to the expanding waveform principle. Preferably, before looping back to 22, the method marks the picture-element as processed.

The method proceeds to 26 at which a three-dimensional (3D) spatial representation of surface is reconstructed based on the heights as calculated for all or a portion of the picture-elements of the grid. The method can optionally proceed to 27 at which the 3D spatial representation is transmitted to a computer readable medium and/or displayed on a display device.

The method ends at 28.

The images processed by the method of the present embodiments can be of any type, including, without limitation, scenery images, endoscopic images, images of a particular object (e.g., a body organ, such as, but not limited to, a face or a finger, an industrial object, such as, but not limited to, an integrated circuit or a dedicated part or tool), images of particular constructions (e.g., a pavement, a wall of a building, a bridge), images of an interior of an enclosure and the like.

The 3D spatial representation obtained by the method of the present embodiments can be used in a variety of areas, including, without limitation detecting fingerprints (e.g., by constructing a 3D spatial representation from a set of images of a fingerprint and comparing the constructed to a reference 3D spatial representation of a fingerprint from a library), indented handwriting, assessment of oil painting, inspection of surfaces (e.g., classification of surface roughness), constructing 3D maps of scenes, face recognition (e.g., by constructing a 3D spatial representation from a set of images of a face of an individual and comparing the constructed to a reference 3D spatial representation of a face from a library) and the like. The method of the present embodiments can also be used in conjunction with endoscopes in order to recover 3D views in real-time as the endoscope is moved by the operator during an endoscopic medical procedure.

One advantage of the technique according to some embodiments of the present invention is that it provides a direct procedure for the 3D shape recovery. In various exemplary embodiments of the invention the technique does not require an intermediate operation. This is contrary to traditional techniques which typically require intermediate operation, such as the calculation of the gradient at each point before calculating any of the heights. A further advantage of the technique of the present embodiments is that the 3D shape recovery is achieved even when images have missing parts, e.g., due to shadows or occlusions.

An additional advantage of the technique of the present embodiments is that it allows 3D reconstruction both when the dimension of the image sensor is large and when the dimension of the image sensor is small compared to the imaged scene or object. This allows processing both images acquired from an orthographic viewpoint and images acquired endoscopically.

This is unlike conventional techniques which can only be applied for orthographic viewing geometry in which the size of the 3D scanner is relatively large with respect to the imaged object, so that parallel light directions are assumed. It is to be understood.

Figure 3:
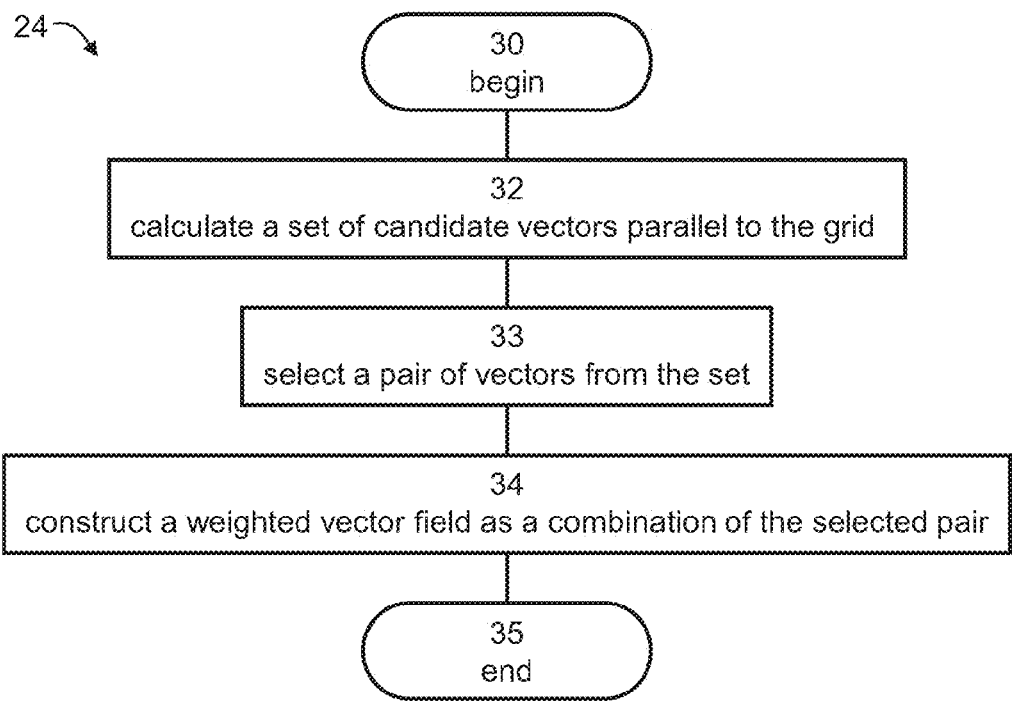

FIG. 3 is a flowchart diagram of a procedure suitable for constructing a weighted vector field according to some embodiments of the present invention. The procedure can be used for operation 24 above.

The procedure begins at 30 and continues to 32 at which vectors for pairs of images of the set of images are calculated. This provides a set of candidate vectors. The candidate vectors can be parallel to the image plane and can be vectors of the characteristic vector field as further detailed hereinabove.

Thus, when the set of images comprises three images $I_1$, $I_2$ and $I_3$, the set of candidate vectors at can include the vectors $\underline{b}^{12}$, $\underline{b}^{13}$ and $\underline{b}^{23}$ calculated as location (x,y).

When the images are endoscopic (for example, when the proportion of the inspected object is much bigger than the 3D scanner), the light propagation directions are non-parallel, and the method preferably parameterizes the illumination vectors as a function of both the coordinates of the picture-element over the grid and the depth z of the point in the scene that corresponds to that picture-element. The parameterization is preferably non-linear with respect to z. In some embodiments, the illumination vectors are parameterized as being reciprocally proportional to the depth z (or, equivalently, proportional to 1/z), so that the quantity zb does not depend on z. A representative of a parameterization suitable for the present embodiments is provided in the Example section that follows. Once the illumination vectors are parameterized, candidate vectors such as vectors of the characteristic vector field can be calculated based on the parameterization.

In various exemplary embodiments of the invention the calculation of the candidate vectors comprises correcting the intensity values for light attenuation. These embodiments are useful particularly, but not exclusively, for endoscopic images. Typically, the correction is calculated in the form of a light attenuation coefficient that multiplies the intensity values. The light attenuation coefficient can corrects for light attenuation due to distance and/or radial attenuation of light. A representative example for calculation of a light attenuation coefficient is provided in the Examples section that follows.

The procedure continues to 33 at which a pair of vectors is selected from the set of candidate vectors. The selection is optionally and preferably based on the angles between pairs of vectors in the set, wherein pairs of vectors that are more orthogonal to each other (namely when the angle between the vectors is more close to 90°) are more favored for being selected than pairs of vectors that are less orthogonal to each other. In some embodiments of the present invention the selected vectors are more orthogonal to each other than at least one other pair of candidate vectors, more preferably more orthogonal to each other than any other pair of candidate vectors.

Thus, the procedure optionally and preferably calculates the angle, or a proxy of the angle, between the two vectors of each pair of candidate vectors, and then selects the pair based on the calculated angle or proxy thereof. A representative example of a proxy of an angle is a scalar product between the two vectors. When the scalar product is calculated, the procedure optionally and preferably selects a pair of vectors for which the scalar product is less than the scalar product for at least one, more preferably any, other pair of candidate vectors.

In embodiments in which the candidate vectors are calculated based on illumination vectors that are parameterized as a function of the coordinates of the picture-element over the grid and the depth z, the calculation of the angle or proxy thereof comprises an estimation of the value of z. Such estimation can be performed, for example, based on the value of z at a neighbor picture-element for which the height of the surface has already been estimated. For the seed picture-element, the value of z can be an input value or it can be measured directly. In various exemplary embodiments of the invention the calculation the angle or proxy thereof does not include estimation of the spatial gradient of the surface.

The procedure continues to 34 at which the weighted vector field is constructed as a combination, e.g., a linear combination of the selected pair. The vectors of the selected pair are preferably weighted by weight coefficients (e.g., coefficients α and β) such as to align the weighted vector field along or approximately along a predetermined direction parallel to the image plane (e.g., the direction selected at 23).

The procedure ends at 34.

Figure 4:
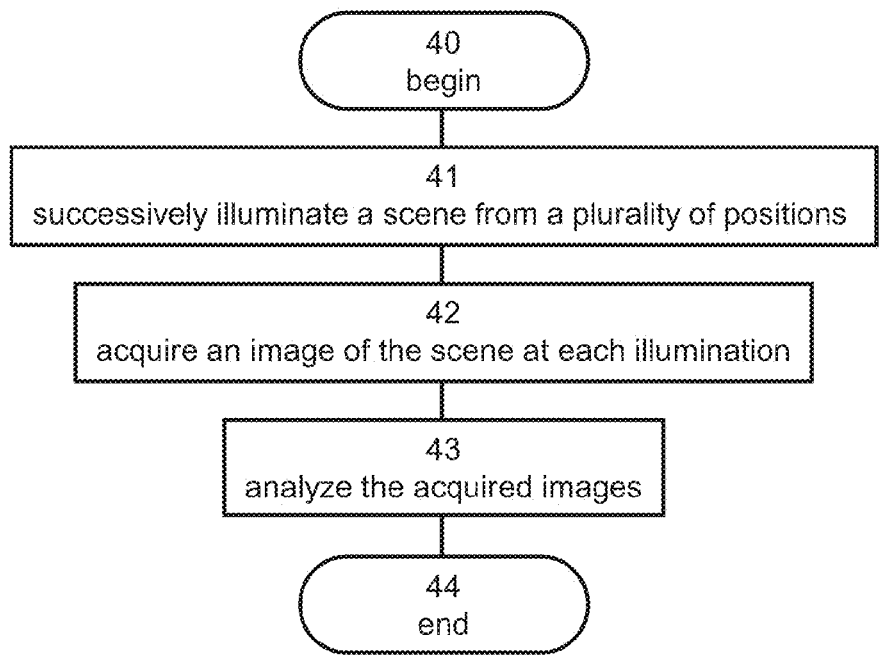

FIG. 4 is a flowchart diagram of a method suitable for imaging according to some embodiments of the present invention. The method begins at 40 and continues to 41 at which a scene or a surface of an object is successively illuminated from a plurality (e.g., 3 or more) of positions. This can be done using a plurality of light sources, or using smaller number of light sources (e.g., a single light source) that can be displaced from one position to the other. The method continues to 42 at which one or more images of the scene is/are acquired at each illumination, thereby providing a set of images of the scene. All or at least a portion of the images of the set are optionally and preferably acquired from the same viewpoint. The method continues to 43 at which the set of images is analyzed, for example, by the method described above.

The method ends at 44.

Figure 5:
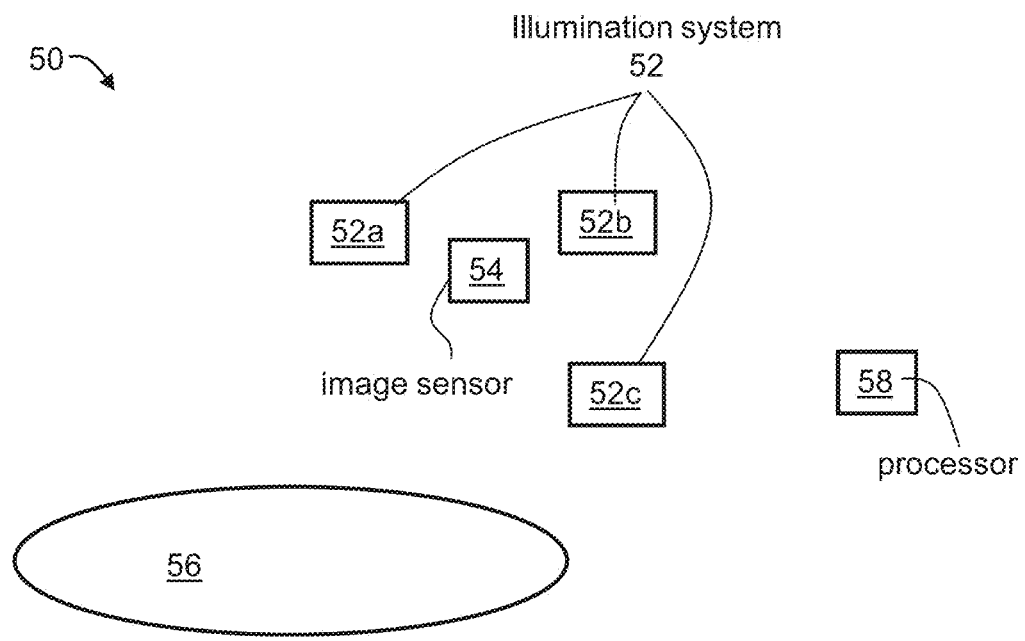

Reference is now made to FIG. 5 which is a schematic illustration of a system 50 for imaging, according to some embodiments of the present invention. System 50 optionally and preferably comprises an illumination system 52 for illuminating a scene from a plurality of positions. Illumination system 52 can includes a plurality (e.g., 3 or more) of light sources 52a, 52b and 52c, as shown in FIG. 5. Illumination system 52 can also include one or more light sources that can be displaced from one position to the other. System 50 further comprises an image sensor or camera 54 for acquiring, from the same viewpoint, at least one image of a scene 56 at each illumination of the surface, thereby providing a set of images of a scene. System 50 can also comprise a data processor 58. Data processor 58 has an electronic circuit and a non-volatile memory medium (not shown) readable by circuit. The memory medium stores program instructions which, when read by the circuit, cause the circuit to receive the images from image sensor 54 and execute the processing method described above.

At least some components of imaging system 50, preferably all the components of system 50, can be included in a portable device such as, but not limited to, a cellular phone, a smartphone, a tablet device, a mobile digital camera, a wearable camera, a portable media player, a portable gaming device, a portable digital assistant device, and a portable navigation device.

Figure 6:
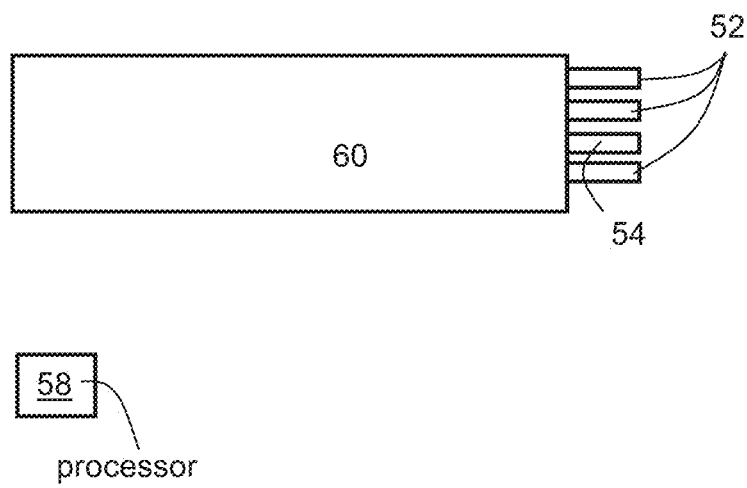

In some embodiments of the present invention the illumination system 52 and the image sensor or camera 54 are mounted on an endoscope 60. These embodiments are illustrated in FIG. 6. The illumination system 52 can be a laser system producing a static laser point or laser line attached to the endoscope and calibrated to automatically provide a set of true depth coordinates for use as seed points. In these embodiments, the height of points in the images other than seed points are calculated as described above. Data processor 58 can be external to endoscope 60. In these embodiments, the images from sensor 54 are transmitted as known in the art to processor 58 for analysis and display.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Direct Surface Reconstruction Using Multiple Images and Shadows

A setting of the Shape-from-Shading (SfS) problem model for an orthographic viewing of a Lambertian surface, is described as follows. An unknown surface h(x, y)=(x, y, z(x, y)), defined on a compact domain $\bar{\Omega}=\partial\Omega \cup \Omega$ is considered. The gradient of z is denoted by $\nabla z=(\partial z/\partial x, \partial z/\partial y)$. The basic Lambertian surface assumption yields an image formation model determined by the inner product between the light source direction w and the outgoing normal to the surface n(x, y), as formulated by the following the reflectance equation [Horn et al., Shape from Shading, MIT Press, 1989]:

$$R(n)(x,y)=\rho(x,y)(\omega \cdot n(x,y))  \quad \text{EQ. 1.1}$$

where $\rho$ is the surface albedo and $\omega=(\omega 1, \omega 2, \omega 3)$ (with $\omega 3>0$) is a unit vector pointing toward a far-away light source. The surface normal is given by:

$$n = \left(-\frac{\partial z}{\partial x}, -\frac{\partial z}{\partial y}, 1\right)\frac{1}{\sqrt{1+|\nabla z|^2}}. \quad \text{EQ. 1.2}$$

With this notation, from EQ. 1.1 we obtain the following nonlinear model of image formation:

$$I(x, y) = \rho(x, y)\frac{-\frac{\partial z}{\partial x}(x, y)\omega_1 - \frac{\partial z}{\partial y}(x, y)\omega_2 + \omega_3}{\sqrt{1+|\nabla z(x, y)|^2}}. \quad \text{EQ. 1.3}$$

Traditional studies which have addressed the SfS problem using this formulation with various types of additional data work in two steps: (i) the estimation of the first derivatives of the surface $\partial z/\partial x$ and $\partial z/\partial y$ (usually via some minimization algorithms); and (ii) the recovery of the height from the gradient field over $\Omega$ (by integration or by functional minimization).

It was found by the present inventors that a two-step procedure introduces approximation errors which can be avoided by considering EQ. 1.3 as a non-linear partial differential equation (PDE) of the Hamilton-Jacobi type for the purpose of direct integration. Such an approach allows recover the function z without passing through its gradient field. In order to directly compute the height of the surface, several variational approaches have been studied using the Euler-Lagrange equations associated with functionals of z(x, y) that involve the given image and iterate based on some prior information on the surface [7]. It was found by the present inventors that such PDEs have several drawbacks, most significant of which is the high order of the partial derivatives involved and the impossibility to have a solution with regularity less than a $C^2$ function.

In the framework of classical PDEs for single image data and known albedo there exists a well known direct approach to SfS which uses level sets [9], [3]. This approach requires knowledge of the albedo.

The present inventors successfully perform PS even when p(x, y) is an unknown function.

There are several ways to collect information about the surface in order to counteract the ill-posedness of EQ. 1.1 and to achieve the reconstruction of the object under observation. Photometric Stereo can be formulated to exploit the information contained in several images of the scene taken from the same viewpoint under different light source directions. Let n be the number of images where each one corresponds to different light sources used in the PS setting, let $PS_n$ be the associated depth recovery problem. In this section a differential formulation of $PS_n$ is derived. The formulation relies on the previous setup of the basic orthographic SfS problem, EQ. 1.1, and therefore the following nonlinear system of PDEs is studied:

$$I_i(x, y) = \rho(x, y)\frac{-\nabla z(x, y)\cdot \tilde{\omega}^i + \omega_3^i}{\sqrt{1+|\nabla z(x, y)|^2}}, \quad \text{EQ. 1.4}$$

where i=1, . . . , n and $I_i$ is the image obtained by lighting up the surface h using the ith light source $\omega^i$. The symbol "~" is used herein to denote the first two component of a vector with three components.

When two images are taken into account, the common nonlinearity $\sqrt{1+|\nabla z(x,y)|^2}$ can be removed by division of the image irradiance equations. An equivalent differential problem, which can be written as:

$$\begin{cases} b(x, y)\cdot \nabla z(x, y) = f(x, y), & a.e.(x, y)\in\Omega; \\ z(x, y) = g(x, y) & \forall (x, y)\in\partial\Omega, \end{cases} \quad \text{EQ. 1.5}$$

admits a unique Lipschitz solution.

In EQ. 1.5, g(x, y) is the boundary condition, $$b(x,y)=(I_2(x,y)\omega'_1-I_1(x,y)\omega''_1, I_2(x,y)\omega'_2-I_1(x,y)\omega''_2) \quad \text{EQ. 1.6}$$

is the characteristics field, and $$f(x,y)=I_2(x,y)\omega'_3-I_1(x,y)\omega''_3. \quad \text{EQ. 1.7}$$

The present inventors exploit the well-posed differential formulation of EQ. 1.5 presented in order to use it for the $PS_3$ problem in the presence of shadows which add further complexity to the surface recovery and remove the need of the boundary condition. Some embodiments of the present invention employ the $PS_3$ formulation where all the data is available (for example, in those picture-elements where none of the three images exhibits shadows), and the $PS_2$ problem for parts of $\Omega$ where there is shadow in one of the captured images.

The present example focuses on the direct computation of the height z by solving a system of linear PDEs.

In the following, it is assumed that the images are acquired after sequential illumination from light source points that are non-coplanar.

For three linearly independent images obtained by individually shining three parallel-ray light sources in non-coplanar directions, a set of unique image pairs can be considered and the following system of linear PDEs can be written:

$$\begin{cases} b^{(1,2)}(x, y)\cdot \nabla z(x, y) = f^{(1,2)}(x, y) \\ b^{(1,3)}(x, y)\cdot \nabla z(x, y) = f^{(1,3)}(x, y) \\ b^{(2,3)}(x, y)\cdot \nabla z(x, y) = f^{(2,3)}(x, y) \end{cases} \quad \text{EQs. 1.8}$$

where

-continued $$b^{(h,k)}(x, y) = (I_k(x, y)\omega_1^h - I_h(x, y)\omega_1^k, I_k(x, y)\omega_2^h - I_h(x, y)\omega_2^k) \quad \text{EQ. 1.9}$$

and $$f^{(h,k)}(x, y) = I_k(x, y)\omega_3^h - I_h(x, y)\omega_3^k \quad \text{EQ. 1.10}$$

with (h, k) being the combination of two of the first three natural integers without repetitions.

According to some embodiments of the present invention the basic differential formulation of EQ. 1.5 is reduced to a single PDE which can handle shadowed regions. EQ. 1.5 does not lose the well-posedness when multiplied by a function q(x, y) on both sides. Thus, a weighted $PS_n$ model (W-$PS_n$) can be defined by considering the functions:

$$b_n^w(x, y) = \sum_{p \in \binom{[n]}{2}} q_p(x, y) b^p(x, y) \quad \text{EQ. 1.11}$$

and $$f_n^w(x, y) = \sum_{p \in \binom{[n]}{2}} q_p(x, y) f^p(x, y) \quad \text{EQ. 1.12}$$

where $$\binom{[n]}{2}$$

is a set of pairs of integer indices with no repetition. For example, when n=3, $$\binom{[3]}{2} = \{(1, 2), (1, 3), (2, 3)\}.$$

The W-$PS_n$ formulation according to some embodiments of the present invention can therefore be written as:

$$\begin{cases} b_n^w(x, y) \cdot \nabla z(x, y) = f_n^w(x, y), & \text{a.e. } (x, y) \in \Omega \\ z(x, y) = g(x, y) & \forall (x, y) \in \partial\Omega \end{cases} \quad \text{EQ. 1.13}$$

The weight-functions $q_p$ (hence also $b_n^w$ and $f_n^w$) are optionally and preferably defined so as to allow handling shadows. It was found by the present inventors that it is possible to use weight-functions that are vanishing while preserving the well-posedness of the problem. The signs of the weight-functions are typically insignificant. The weight-functions are optionally and preferably selected so that there is a set of points where they are null (e.g., zero).

It was found by the present inventors that the well-posedness of the differential formulation is guaranteed for image pixels lit in at least two images and preserved if the same condition holds in the multi-image, weighted case.

In the following, it is assumed that each pixel is illuminated in at least two images thereby avoiding reduction to a $PS_1$ problem. The weight-functions are optionally and preferably considered as switches that locally nullify the involvement of an image pair in the summations of EQs. 1.11 and 1.12, when the functions $b^p$ and $f^p$ for that pair do not contain relevant information due to the presence of shadows in the images involved. Without loss of generality, a point $(x, y) \in \Omega$ can be considered as shadowed in the ith image when $I_i(x, y)=0$. This definition of shadow corresponds to an imaging condition which is devoid of ambient light. When ambient light, the point can be considered as shadow when $I_i(x, y)=I_0$, where $I_0$ is the intensity of the ambient light.

In some embodiments of the present invention the weight-functions are defined using the Heaviside function as follows $$q(h,k)=H(I_h(x,y))H(I_k(x,y)). \quad \text{EQ. 1.14}$$

It was found by the present inventors that although these functions are not continuous, they can be used without complicating EQ. 1.13, e.g., by employing a regularization of EQ. 1.14. For example, the shadows can be defined as open sets, and the weight-functions can be regularized using cutoff functions as known in the art (see, for example, K. O. Friedrichs, 1944, Transactions of the American Mathematical Society, 55(1): pp. 132-151).

The present inventors have successfully proved the uniqueness of the solution of EQ. 1.13 in the Lipschitz function space via a method of characteristics. The solution is referred to as a "weak solution" to indicate that it is defined almost everywhere in $\overline{\Omega}$, as a combination of smooth solutions, $C^2$, each defined on a different domain.

The term "almost everywhere" is well known in the field of mathematical analysis. It describes a property that holds for every point within a domain except, perhaps, for a set of points, wherein the set of points for which the property does not hold is a set of measure zero.

According to some embodiments of the present invention these domains are patched together in such a way that, across the boundaries between domains on which there are discontinuities in some derivatives, the EQ. 1.13 is satisfied.

The points where the surface z is not differentiable are the same where the functions $b_n^w$ and $f_n^w$ are discontinuous (jump discontinuity). The present inventors have successfully proved that: (i) there is no critical point for the projected characteristic field, i.e., $b_3^w(x, y) \neq (0,0)$; and (ii) the propagation of the information from the boundary is not prevented between two sets separated by discontinuity. These two proven observation are referred to below as observation R1 and R2.

It was found by the present inventors that a three-dimensional reconstruction can be executed even what the boundary condition g(x, y) of EQ. 1.13 is not known. This is optionally and preferably done by employing a numerical strategy which comprises selecting a single arbitrarily valued initial seed point within the reconstruction domain and manipulating the path of the characteristics. The present inventors found that such path manipulation allows to numerically integrate EQ. 1.13 in a manner that allows the 3D shape reconstruction to be performed for the whole domain in directions that surround the shadows (see FIG. 8).

The present inventors proved a theorem according to which two different vector fields $b^{p_1}$ and $b^{p_2}$ cannot be parallel. Formally, this theorem can be written as:

$$b^{p_1}(x,y) b^{p_2}(x,y) \neq \pm |b^{p_1}(x,y)||b^{p_2}(x,y)|. \quad \text{EQ. 1.15}$$

This theorem is optionally and preferably exploited to control the direction of the reconstruction propagation for the case when n=3 which can be generalized according to some embodiments of the present invention to any number of images.

Consider a set of three-lighted pixels M through its indicator function as follows:

$$I_M(x,y)=H(I_1(x,y))H(I_2(x,y))H(I_3(x,y)). \qquad \text{EQ. 1.16}$$

The functions $q_p$ in EQs. 1.11 and 1.12 are optionally and preferably selected to provide a linear weighted combination, for example, as given by the following two indexes:

$$(p_1^*, p_2^*) = \underset{(p1,p2)\in\binom{[3]}{2}}{\mathrm{argmin}} |b^{p1} \cdot b^{p2}| \qquad \text{EQ. 1.17}$$

with the aim to span the set of all possible directions of the derivatives by using the two least ill-conditioned directions $b^{p^*_1}$ and $b^{p^*_2}$. Since $q_p(x, y)\equiv 1$ for every point (x,y) in M and for every p in the set $$\binom{[3]}{2},$$

EQ. 1.8 can be summed as follows:

$$(\alpha b^{p^*_1}+\beta b^{p^*_2})\cdot \nabla z = \alpha f^{p^*_1}+\beta f^{p^*_2} \qquad \text{EQ. 1.18}$$

where $\alpha$ and $\beta$ are real coefficients. EQ. 1.18 is a version of EQ. 1.13 for a specific picture-element under analysis.

Thus, the present embodiments allow a full control over the direction in which the first derivatives of z is computed, independently at any pixel, provided no shadows are involved. The coefficients $\alpha$ and $\beta$ are optionally and preferably selected to control the characteristic direction at a pixel to be in the most favorable direction according to the presence of shadows. Eight primary directions are illustrated in FIG. 7 on an axis aligned discretization grid. These directions can be integration directions resulting from the possible locations accessible by a predetermined numerical scheme. Some representative numerical schemes are provided hereinbelow.

Once a particular direction d is selected at a point (x, y)$\in$M, the value for ($\alpha$, $\beta$) can be calculated so that $$\begin{pmatrix} b_1^{p_1^*}(x,y) & b_1^{p_2^*}(x,y) \\ b_2^{p_1^*}(x,y) & b_2^{p_2^*}(x,y) \end{pmatrix} \begin{pmatrix} \alpha \\ \beta \end{pmatrix} = \begin{pmatrix} d_1(x,y) \\ d_2(x,y) \end{pmatrix}. \qquad \text{EQ. 1.19}$$

The aforementioned theorem guarantees that EQ. 1.19 has a unique solution, and the selection EQ. 1.17 ensures that it is numerically stable.

The picture-element under analysis is optionally and preferably selected according to a wavefront expansion principle. FIG. 8, illustrates a wavefront expansion procedure that can be employed according to some embodiments of the present invention. The procedure according to some optional embodiments of the present invention can be summarized as follows:

1) Fix an arbitrary value to z for a point towards the center of the image domain not in shadow (see point ($\bar{x}$, $\bar{y}$) in FIG. 8), and add all of that point's neighbors to a list of pixels to be visited.

2) Traverse the list of pixels to be visited and update the value for z for each one by calculating $p^*_1$, $p^*_2$, $\alpha$ and $\beta$ depending on the shadow position as required by the selected numerical scheme (see e.g., EQ. 1.21 and 1.23, below);

3) For each newly visited pixel, add its unvisited neighbors to the list of pixels to be visited.

4) In case of shadows, change the wavefront propagation direction in order to surround the shadow sets, as shown by the small arrows at the upper right corner of FIG. 8. This corresponds to a computation of the boundary condition. Then solve the appropriate equation in EQs. 1.8 in the set of shadowed pixels when the wavefront expansion direction is in agreement with the shadowed pixel's characteristic direction.

5) Repeat operations 1-4 until some stopping condition on convergence is fulfilled.

Due to the formulation of EQ. 1.13, non-shadow pixels can be processed by selecting the direction of the characteristic vector field b so that the direction surrounds the shadows. The advancing wavefront makes new pixels available to be updated even when they are in the shadow set because at some point the direction of advance of the wavefront will be consistent with the direction of a pixel's characteristic which sits along the border of the shadow set. This pixel can then be added to the set of pixels to be visited and in turn acts as a seed pixel that enables other points in the shadow set to be updated in the next incremental advance of the wavefront. In such a way the entire set of pixels can be visited and correctly updated.

Following is a description of some numerical schemes according to some embodiments of the present invention.

The present example relates to a square domain $\Omega$ like the set $[a, b]^2$ with a uniform discretization space step $\Delta=(b-a)/k$ where k is the number of intervals divided by the side of the square (that is $x_i=1+i\Delta$, $y_j=1+j\Delta$, with i, j=0, . . . , k). The symbol $\overline{\Omega}_d$ is used to denote all the points of the grid belonging to $\overline{\Omega}$, the symbol $\Omega_d$ is used to denote all the internal points and the symbol $\partial\Omega_d$ is used to denote all the boundary points.

The numerical schemes described below are used for forward approximation of EQ. 1.13 where the propagation of the information is considered according with the direction of the vector field that selects the direction of the derivatives. In order to simplify the notation, $b_3^w(x_i, y_i)$ is abbreviated below as $b_{i,j}=(b_{i,j}^1, b_{i,j}^2)$, and $f_3^w(x_i, y_i)$ is abbreviated below as $f_{i,j}$. Note that $b_{i,j}$ is a two-dimensional vector field, while $f_{i,j}$ is a scalar field. The approximated height of the surface at $(x_i, y_i)$ is denoted $Z_{i,j}$.

In some embodiments of the present invention a forward upwind scheme is employed. The scheme is referred to as "forward upwind" since it follows the direction of propagation.

Such a scheme can be written as:

$$b_{i,j}^1 \frac{Z_{i+1,j}-Z_{i-1,j}}{2\Delta} + b_{i,j}^2 \frac{Z_{i,j+1}-Z_{i,j-1}}{2\Delta} = f_{i,j} + |b_{i,j}^1|\frac{Z_{i+1,j}-2Z_{i,j}+Z_{i-1,j}}{2\Delta} + |b_{i,j}^2|\frac{Z_{i,j+1}-2Z_{i,j}+Z_{i,j-1}}{2\Delta} \qquad \text{EQ. 1.20}$$

for i, j=1, . . . , k-1. The artificial diffusion introduced in the right side of EQ. 1.20 allows following the vector field b by considering the most appropriate discretization for the first derivative in order to track the characteristic lines. In particular it consists of a numerical scheme of consistency order equal to one with respect to both partial derivatives.

EQ. 1.20 can be written as an iterative equation as follows:

$$Z_{i,j}^{t+1} = \frac{|b_{i,j}^1| Z_{i-sgn(b_{i,j}^1),j}^t + |b_{i,j}^2| Z_{i,j-sgn(b_{i,j}^2)}^t + f_{i,j}\Delta}{|b_{i,j}^1| + |b_{i,j}^2|} \qquad \text{EQ. 1.21}$$

which is well-posed due to observation R1 that guarantees that the existence of the denominator in EQ. 1.21 does not involve any difficulty.

In some embodiments of the present invention a forward semi-Lagrange scheme is employed. In these embodiments, the following equation, obtained by dividing the two sides of the upper expression in EQ. 1.13 by the norm of $b_3^w(x, y)$ $$\nabla_\gamma z(x, y) = \frac{f_3^w(x, y)}{|b_3^w(x, y)|} \quad \forall (x, y) \in \Omega \qquad \text{EQ. 1.22}$$

where $\gamma(x, y) = b_3^w(x, y)/|b_3^w(x, y)|$. The division by $|b_3^w(x, y)|$ does not involve any difficulties for the numerical scheme due to observation R1.

Considering the definition of the directional derivative (in the opposite direction of γ, hence also of the characteristic vector field b), a semi-Lagrangian scheme can be written as follows:

$$(sL) \quad Z_{i,j}^{t+1} = Z^t(x_i - h\gamma_{i,j}^1, y_j - h\gamma_{i,j}^2) + \frac{f_{i,j}}{|b_{i,j}|}h \qquad \text{EQ. 1.23}$$

where the parameter h is greater than zero and is assumed equal to the size of the grid Δ in order to reach the highest order of convergence equal to one.

Results

A numerical analysis of convergence of the numerical schemes introduced above is presented. In this a Lipschitz surface that, besides points of discontinuity, presents high slope (a large Lipschitz constant) is considered. The initial images are shown in FIGS. 9A-C. The images are synthesized using an analytical function of a surface z in the domain $\Omega_d = [-1, 1]^2$. The images include artificial shadow regions together with a non constant albedo mask. The image data were deliberately corrupted with 5% Gaussian noise to further improve the realism of the simulation. The iterations for both schemes were stopped when the $L^\infty$ discrete norm, defined as $$E_{L^\infty} = \max_{(x_i, y_j) \in \Omega_d} |Z^t(x_i, y_j) - z(x_i, y_j)|, \qquad \text{EQ. 1.24}$$

Was less than a parameter c selected to be $10^{-7}$. Table 1, below, displays the error together with the measured run time at convergence.

|  |  | up-wind |  | semi-Lagrangian |  |
| --- | --- | --- | --- | --- | --- |
|  | Δ | $L^\infty$ | time (sec) | $L^\infty$ | time (sec) |
| 5% | 500 | $3.539 \times 10^{-2}$ | 0.162 | $2.332 \times 10^{-2}$ | 0.171 |
|  | 1000 | $2.185 \times 10^{-2}$ | 0.561 | $1.166 \times 10^{-2}$ | 0.623 |
|  | 2000 | $1.368 \times 10^{-2}$ | 2.783 | $6.248 \times 10^{-3}$ | 3.029 |
|  | 500 | $6.635 \times 10^{-2}$ | 0.161 | $5.855 \times 10^{-2}$ | 0.274 |
|  | 1000 | $3.578 \times 10^{-2}$ | 0.553 | $3.698 \times 10^{-2}$ | 1.201 |
|  | 2000 | $3.917 \times 10^{-2}$ | 2.684 | $3.916 \times 10^{-2}$ | 4.354 |

The numerical schemes were all implemented in C++ MEX files and executed in Matlab® using a single core of a 2012 Intel® Core i7 2.3.GHz MacBook Pro. In this example, the parallelism available to an implementation of the integration strategy has not been utilized. Despite this limitation the algorithm runs at 6 fps for images of size 500×500.

FIGS. 10A-C show the surfaces recovered from noisy images with four megapixels, where FIG. 10A shows the original surface, FIG. 10B shows the reconstructed surface using the upwind scheme, and FIG. 10C shows the reconstructed surface obtained the semi-Lagrange scheme.

FIGS. 11A-C show a set of three images of the well-known Beethoven bust with synthetic shadows added to complicating the shape recovery, and FIG. 12 shows a surface as reconstructed from FIGS. 11A-C according to some embodiments of the present invention, using the upwind scheme. As shown, the reconstructed surface does not have evident artifacts also in zones where the information has been removed by the synthetic shadows.

FIGS. 13A-C are a set of three images of a coin. These images have shadows on different zones around the border of the human figure. FIG. 14 shows a surface as reconstructed from FIGS. 13A-C according to some embodiments of the present invention, using the upwind scheme. The reconstruction shows that the human shape is well computed and furthermore, that the flat region around this shape has been well preserved.

Example 2

Endoscopic-Perspective Photometric Stereo (EPPS)

The present example provides to a formulation for the shape from Endoscopic Perspective problem solved via a Photometric Stereo technique using n images ($EPPS_n$). The differences with respect to the previous (i.e. orthographic) case are based on the need of parameterize properly light propagation and light attenuation together with perspective viewing geometry.

SfS models of perspective cameras are known [Tankus et al., IJCV, 2005, 63(1):21-43; Prados et al., 2005, In CVPR, volume 2, pages 870-877. IEEE Computer Society, 2005; B. K. P. Horn, 1975, the Psychology of Computer Vision, Winston, P. H. (Ed.), pages 115-155; and Hasegawa et al., 1996, Computers and Graphics, 20(3):351-364]. Also known are Perspective SfS (PSfS) models applied to endoscopic analysis [Yeung et al., 1999, In C. Taylor and A. Colchester, editors, MICCAI, volume 1679, pages 318-327; Narasimhan et al., 2009, IJCV, pages 211-228; and Okatani et al., 1997, Computer Vision and Image Understanding, 66(2):119-131].

A parameterization of a surface Σ is illustrated in FIG. 15. The parameterization is up to an unknown function z from the image domain $\overline{\Omega}^p = \Omega^p \cup \partial\Omega^p$ to $\Re$ where $\Re$ is the set of real numbers. The parameterization can be written as $$M(\xi, \eta) = (\hat{x}(\xi, \eta), \hat{y}(\xi, \eta), \hat{z}(\xi, \eta)) = z(\xi, \eta)m_s(\xi, \eta) \qquad \text{EQ. 2.1}$$

where $$m_s(\xi, \eta) = \frac{f}{d}m(\xi, \eta) \text{ and } m(\xi, \eta) = (\xi, \eta, -f) \qquad \text{EQ. 2.2}$$

f is the focal length of the camera, $d = \sqrt{\xi^2 + \eta^2 + f^2}$, and the triple $(\hat{x}(\xi,\eta), \hat{y}(\xi,\eta), \hat{z}(\xi,\eta))$, abbreviated as $(\hat{x}, \hat{y}, \hat{z})$, are the real world coordinates (with respect to the image coordinates). The parameterization of EQ. 2.1 is based on the pinhole camera model and is due to the specific perspective viewing geometry as seen in FIG. 15 where the camera is placed at the origin C of the coordinate system $Cx\hat{y}\hat{z}$ (at the optical center).

The outgoing normal vector to the surface $\Sigma$ is:

$$\overline{n}(\xi, \eta) = \left(f\left(z_\xi - \frac{\xi z}{d^2}\right), f\left(z_\eta - \frac{\eta z}{d^2}\right), \frac{zf^2}{d^2} + \xi z_\xi + \eta z_\eta\right) \quad \text{EQ. 2.3}$$

Since the irradiance equation depends on the unit normal, the following unit normal vector is used:

$$n(\xi, \eta) = \frac{\overline{n}(\xi, \eta)}{|\overline{n}(\xi, \eta)|}. \quad \text{EQ. 2.4}$$

The present Example considers an irradiance equation for Lambertian surfaces, given by the cosine law by the following inner product:

$$I(\xi,\eta) = \rho(\xi,\eta)[n(\xi,\eta) \cdot \omega(\xi,\eta)] \quad \text{EQ. 2.5}$$

where $I:\overline{\Omega}^p \to [0,1]$ is the image function, $\rho(\xi, \eta)$ is the unknown albedo and $\omega(\xi, \eta)$ is the light source direction.

The light direction $\omega$ incident to the surface depends explicitly on the image points $(\xi, \eta)$ since the endoscopic formulation assumes close light source illumination.

Since the Photometric Stereo uses several light sources, realistic placements $(x_i, y_i)$ are considered on the optical plane $z=0$. The light directions are defined as:

$$\omega^i(\xi, \eta, z) = \frac{\left(\frac{x^i d}{fz} - \xi, \frac{y^i d}{fz} - \eta, f\right)}{\sqrt{\left(\xi - \frac{x^i d}{fz}\right)^2 + \left(\eta - \frac{y^i d}{fz}\right)^2 + f^2}} = \frac{\overline{\omega}^i(\xi, \eta, z)}{q_i(\xi, \eta, z)} \quad \text{EQ. 2.6}$$

where $$q_i(\xi, \eta, z) = \sqrt{\left(\xi - \frac{x^i d}{fz}\right)^2 + \left(\eta - \frac{y^i d}{fz}\right)^2 + f^2}. \quad \text{EQ. 2.7}$$

In the present Example, the light directions depend on the point $(\xi, \eta)$, as well as on z, since they are displaced from the optical center. This introduces a non-linearity that does not involve the derivatives of the unknown, but only z.

In various exemplary embodiments of the invention at least two different kinds of light attenuation are considered. A first type relates to the reduction of light energy proportional the inverse squared distance between the light source and object. A second type results from a realistic directional lighting model of a surface mount device (SMD) light. Use of other continuous attenuation models is also contemplated.

The first kind of light attenuation can be modeled by computing the distance between the light source and the surface explicitly. The functions $r_1(\xi, \eta, z)$ and $r_2(\xi, \eta, z)$ define the distances between the point of the surface $(x, y, \hat{z})$ and the respective light source. Since the light sources are shifted with respect to the origin, the distance function is:

$$r_i(\xi, \eta, z) = dist\left((x^i, y^i, 0), \left(\frac{f\xi z}{d}, \frac{f\eta z}{d}, \frac{-f^2 z}{d}\right)\right) \quad \text{EQ. 2.8}$$

$$= \frac{fz}{d}\sqrt{\left(\xi - \frac{x^i d}{fz}\right)^2 + \left(\eta - \frac{y^i d}{fz}\right)^2 + f^2}$$

$$= \frac{fz}{d} q_i(\xi, \eta, z).$$

The attenuation factor can then be written as $1/r_i^2$.

Many existing light sources are directional. That is to say they are bright along a principal direction and become less bright at angles further from the main direction. This behavior is illustrated in FIG. 16. The attenuation due to the directionality can be effectively simulated by multiplication with $Cos(\gamma)^{r_a}$, where $r_a$ is the attenuation coefficient and is reminiscent of the specular model for surface reflectance.

The attenuation factor is computable since $$[\cos(\gamma)(\xi, \eta, z)]^{r_a} = [\omega^i(\xi, \eta, z) \cdot (0, 0, 1)]^{r_a} = \left[\frac{f}{q_i(\xi, \eta, z)}\right]^{r_a} \quad \text{EQ. 2.9}$$

where $\omega^i(\xi, \eta, z)$ is the ith light source placed at $(x^i, y^i)$.

Both attenuation effects can be expressed by multiplication of the following factor:

$$\frac{f^{r_a}}{r_i^2(\xi, \eta, z) q_i^{r_a}(\xi, \eta, z)} = \frac{d^2 f^{r_a - 2}}{z^2 q_i^{r_a + 2}(\xi, \eta, z)}. \quad \text{EQ. 2.10}$$

In the present example, the following irradiance equations are considered:

$$I_i(\xi, \eta) = \rho(\xi, \eta) \frac{\overline{\omega}^i(\xi, \eta, z) \cdot n(\xi, \eta)}{r_i^2(\xi, \eta, z) q_i^{r_a + 1}(\xi, \eta, z)} f^{r_a} \quad \text{EQ. 2.11}$$

$$= \rho(\xi, \eta) \frac{\overline{\omega}^i(\xi, \eta, z) \cdot n(\xi, \eta) d^2 f^{r_a - 2}}{z^2 \left[\left(\xi - \frac{x^i d}{fz}\right)^2 + \left(\eta - \frac{y^i d}{fz}\right)^2 + f^2\right]^{\frac{r_a + 3}{2}} |\overline{n}(\xi, \eta)|}.$$

where $$\overline{\omega}^i(\xi, \eta, z) \cdot \overline{n}(\xi, \eta) = z_\xi \frac{x^i d}{z} + z_\eta \frac{y^i d}{z} + f_z - \frac{x^i \xi}{d} - \frac{y^i \eta}{d}. \quad \text{EQ. 2.12}$$

Two irradiance equations like EQ. 2.11, obtained with two different light sources, can be merged by noting that the non-vanishing quantity $\rho(\xi,\eta) d^2 f^{r_a - 2}/|\overline{n}(\xi,\eta)| z^2$ is present in both of them:

$$\frac{I_1(\xi, \eta)\left[\left(\xi - \frac{x' d}{fz}\right)^2 + \left(\eta - \frac{y' d}{fz}\right)^2 + f^2\right]^{\frac{r_a + 3}{2}}}{z_\xi \frac{x' d}{z} + z_\eta \frac{y' d}{z} + fz - \frac{x' \xi}{d} - \frac{y' \eta}{d}} = \quad \text{EQ. 2.13}$$

$$\frac{I_2(\xi, \eta)\left[\left(\xi - \frac{x'' d}{fz}\right)^2 + \left(\eta - \frac{y'' d}{fz}\right)^2 + f^2\right]^{\frac{r_a + 3}{2}}}{z_\xi \frac{x'' d}{z} + z_\eta \frac{y'' d}{z} + fz - \frac{x'' \xi}{d} - \frac{y'' \eta}{d}}.$$

This merge allows to eliminate the non-linearity with respect to the partial derivatives of z contained in $|\overline{n}(\xi,\eta)|$ and makes the resulting expression independent of the albedo.

The following first-order quasi-linear PDE can thus be obtained $$(EPPS_2)\begin{cases} b(\xi, \eta, z) \cdot \nabla z(\xi, \eta) = s(\xi, \eta, z), & \text{on } \Omega^p \\ z(\xi, \eta) = g(\xi, \eta) & \text{on } \partial\Omega^p \end{cases} \quad \text{EQ. 2.14}$$

where $$b(\xi, \eta, z) = \frac{d}{z}\left(I_1(\xi, \eta)q_1^{r_a+3}x'' - I_2(\xi, \eta)q_2^{r_a+3}x', \right.$$
$$\left. I_1(\xi, \eta)q_1^{r_a+3}y'' - I_2(\xi, \eta)q_2^{r_a+3}y'\right) \quad \text{EQ. 2.15}$$

and $$s(\xi, \eta, z) = fz\left[I_2(\xi, \eta)q_2^{r_a+3} - I_1(\xi, \eta)q_1^{r_a+3}\right] + \\ \frac{1}{d}\left[I_1(\xi, \eta)q_1^{r_a+3}(x''\xi + y''\eta) - I_2(\xi, \eta)q_2^{r_a+3}(x'\xi + y'\eta)\right]. \quad \text{EQ. 2.16}$$

where $|q_i^{r_a+3} = q_i^{r_a+3}(\xi, \eta, z)$.

For three images the following PDEs are obtained:

$$b^{(m,l)}(\xi, \eta, z) \cdot \nabla z(\xi, \eta) = s^{(m,l)}(\xi, \eta, z), \text{ on } \Omega^p \quad \text{EQ. 2.17}$$

where $$b^{(m,l)}(\xi, \eta, z) = \frac{d}{z}\left(I_m(\xi, \eta)q_m^{r_a+3}x^l - I_l(\xi, \eta)q_l^{r_a+3}x^m, \right.$$
$$\left. I_m(\xi, \eta)q_m^{r_a+3}y^l - I_l(\xi, \eta)q_l^{r_a+3}y^m\right) \quad \text{EQ. 2.18}$$

and $$s^{(m,l)}(\xi, \eta, z) = fz\left[I_l(\xi, \eta)q_l^{r_a+3} - I_m(\xi, \eta)q_m^{r_a+3}\right] + \\ \frac{1}{d}\left[I_m(\xi, \eta)q_m^{r_a+3}(x^l\xi + y^l\eta) - I_l(\xi, \eta)q_l^{r_a+3}(x^m\xi + y^m\eta). \quad \text{EQ. 2.19}$$

with (m, l) being the combination of two of the first three natural integers without repetitions.

Similarly to Example 1, a weighted $EPPS_n$ (W-$EPPS_n$) is defined, using the following weighted functions:

$$b_n^\omega(\xi, \eta, z) = \sum_{t \in \binom{[n]}{2}} \omega_t(\xi, \eta)b^t(\xi, \eta, z) \quad \text{EQ. 2.20}$$

$$s_n^\omega(\xi, \eta, z) = \sum_{t \in \binom{[n]}{2}} \omega_t(\xi, \eta)s^t(\xi, \eta, z). \quad \text{EQ. 2.21}$$

The W-$EPPS_n$ formulation according to some embodiments of the present invention can therefore be written as:

$$\begin{cases} b_n^\omega(\xi, \eta, z) \cdot \nabla z(\xi, \eta) = s_n^\omega(\xi, \eta, z), & a.e.(\xi, \eta) \in \Omega^p \\ z(\xi, \eta) = g(\xi, \eta) & \forall (\xi, \eta) \in \partial\Omega^p \end{cases} \quad \text{EQ. 2.22}$$

The weight-functions $w_t$ (hence also $b_n^w$ and $s_n^w$) are optionally and preferably defined so as to allow handling shadows. It was found by the present inventors that it is possible to use weight-functions that are vanishing while preserving the well-posedness of the problem. The signs of the weight-functions are typically insignificant. The weight-functions are optionally and preferably selected so that there is a set of points where they are null (e.g., zero).

It was found by the present inventors that the well-posedness of the differential formulation is guaranteed for image pixels lit in at least two images and preserved if the same condition holds in the multi-image, weighted case.

In the following, it is assumed that each pixel is illuminated in at least two images thereby avoiding reduction to an $EPPS_1$ problem. The weight-functions are optionally and preferably considered as switches that locally nullify the involvement of an image pair in the summations of EQs. 2.20 and 2.21, when the functions $b^t$ and $s^t$ for that pair do not contain relevant information due to the presence of shadows in the images involved. Without loss of generality, a point $(x, y) \in \overline{\Omega}$ can be considered as shadowed in the ith image when $I_i(\xi, \eta) = 0$. This definition of shadow corresponds to an imaging condition which is devoid of ambient light. When ambient light, the point can be considered as shadow when $I_i(x, y) = I_0$, where $I_0$ is the intensity of the ambient light.

In some embodiments of the present invention the weight-functions are defined using the Heaviside function as follows $$w(m,l) = H(I_m(\xi,\eta))H(I_l(\xi,\eta)). \quad \text{EQ. 2.23}$$

It was found by the present inventors that although these functions are not continuous, they can be used without complicating EQ. 2.22, e.g., by employing a regularization of EQ. 2.23. For example, the shadows can be defined as open sets, and the weight-functions can be regularized using cutoff functions as known in the art (see, for example, Friedrichs, 1944, supra).

The present inventors have successfully proved the uniqueness of the solution of EQ. 2.14 in the Lipschitz function space via a method of characteristics. The solution is referred to as a "weak solution" to indicate that it is combination of classical solutions, each defined on a different domain and Lipschitz continuous on the entire $\Omega^p$.

The points where the surface z is not differentiable are the same where the functions $b_n^w$ and $s_n^w$ are discontinuous (jump discontinuity). The observations R1 and R2 presented in Example 1 apply mutatis mutandis also to the case of EWPPS.

The present inventors successfully computed z without completely eliminating the non-linearity. The quasi-linear PDE of EQ. 2.14 still contains a non-linear component, but the present inventors found that the problem of recovering z can be successfully achieved directly by solving a quasi-linear PDE.

According to some embodiments of the present invention a numerical procedure for reconstructing the surface comprises selecting an arbitrarily valued initial seed point within the reconstruction domain and manipulating the path of the characteristics.

The present inventors proved a theorem according to which two different vector fields $b^{t_1}$ and $b^{t_2}$ cannot be parallel. Formally, this theorem can be written as:

$$b^{t_1}(\xi,\eta,z)b^{t_2}(\xi,\eta,z) \neq \pm |b^{t_1}(\xi,\eta,z)||b^{t_2}(\xi,\eta,z)|. \quad \text{EQ. 2.24}$$

This theorem is optionally and preferably exploited to control the direction of the characteristics for the case when n=3 which can be generalized according to some embodiments of the present invention to any number of images.

Consider a set of three-lighted pixels M through its indicator function as follows:

$$I_M(\xi,\eta) = H(I_1(\xi,\eta))H(I_2(\xi,\eta))H(I_3(\xi,\eta)). \quad \text{EQ. 2.25}$$

The functions $w_t$ in EQs. 2.20 and 2.21 are optionally and preferably selected to provide a linear weighted combination, for example, as given by the following two indexes:

$$(t_1^*, t_2^*) = \underset{(t_1,t_2)\in\binom{[3]}{2}}{\operatorname{argmin}} |b^{t1} \cdot b^{t2}| \qquad \text{EQ. 2.26}$$

Since $w_t(\xi, \eta) \equiv 1$ for every point $(\xi,\eta)$ in M and for every t in the set $$\binom{[3]}{2},$$

EQ. 2.17 can be summed as follows:

$$(\alpha b^{t^{*1}} + \beta b^{t^{*2}}) \cdot \nabla z = \alpha s^{t^{*1}} + \beta s^{t^{*2}} \qquad \text{EQ. 2.27}$$

where $\alpha$ and $\beta$ are real coefficients.

Thus, the present embodiments allow a full control over the direction in which the first derivatives of z is computed, independently at any pixel, provided no shadows are involved. The coefficients $\alpha$ and $\beta$ are optionally and preferably selected to control the characteristic direction at a pixel to be in the most favorable direction as required by some integration strategy. Similarly to Example 1, the directions in FIG. 7, or other directions if desired, can be integration directions resulting from the possible locations accessible by a predetermined numerical scheme. Some representative numerical schemes are provided hereinbelow.

Once a particular direction d is selected at a point $(\xi, \eta) \in M$, the value for $(\alpha, \beta)$ can be calculated so that $$\begin{pmatrix} b_1^{t_1^*}(\xi,\eta,z) & b_1^{t_2^*}(\xi,\eta,z) \\ b_2^{t_1^*}(\xi,\eta,z) & b_2^{t_2^*}(\xi,\eta,z) \end{pmatrix} \begin{pmatrix} \alpha \\ \beta \end{pmatrix} = \begin{pmatrix} d_1(\xi,\eta) \\ d_2(\xi,\eta) \end{pmatrix}. \qquad \text{EQ. 2.28}$$

The aforementioned theorem guarantees that EQ. 2.28 has a unique solution, and the selection EQ. 2.26 ensures that it is well conditioned.

The picture-element under analysis is optionally and preferably selected according to a wavefront expansion principle. The representative wavefront expansion principle shown in FIG. 8, can be employed also for the case of EPPS. A suitable procedure according to some optional embodiments of the present invention can be summarized as follows:

1) Fix an arbitrary value to z for a point towards the center of the image domain not in shadow, and add all of that point's neighbors to a list of pixels to be visited.

2) Traverse the list of pixels to be visited and update the value for z for each one by calculating $t^*_1$, $t^*_2$, $\alpha$ and $\beta$ after determining what information is available as required by the selected numerical scheme (see e.g., EQ. 2.30, below).

3) For each newly visited pixel, add its unvisited neighbors to the list of pixels to be visited.

4) In case of shadows, change the wavefront propagation direction in order to surround the shadow sets, as shown by the small arrows at the upper right corner of FIG. 8. This corresponds to a computation of the boundary condition. Then solve the appropriate equation in EQs. 2.17 in the set of shadowed pixels when the wavefront expansion direction is in agreement with the shadowed pixel's characteristic direction.

5) Repeat operations 1-4 until some stopping condition on convergence is fulfilled.

Following is a description of a numerical scheme suitable for EPPS according to some embodiments of the present invention. The numerical scheme is used for forward approximation of EQ. 2.22 where the propagation of the information is considered according with the direction of the vector field that selects the direction of the derivatives. In order to simplify the notation, $b_3^w(\xi_i, \eta_j, z(\xi_i, \eta_j))$ is abbreviated below as $b_{i,j}(z_{i,j}) = (b_{i,j}^1(z_{i,j}), b_{i,j}^2(z_{i,j}))$, and $s_3^w(\xi_i, \eta_j, z(\xi_i,\eta_j))$ is abbreviated below as $s_{i,j}(z_{i,j})$. Note that $b_{i,j}$ is a two-dimensional vector field, while $s_{i,j}$ is a scalar field. The approximated height of the surface at $(x_i, y_j)$ is denoted $Z_{i,j}$.

In some embodiments of the present invention a forward upwind scheme is employed. The forward upwind scheme can be written as:

$$b_{i,j}^1(Z_{i,j}) \frac{Z_{i+1,j} - Z_{i-1,j}}{2\Delta} + b_{i,j}^2(Z_{i,j}) \frac{Z_{i,j+1} - Z_{i,j-1}}{2\Delta} = \qquad \text{EQ. 2.29}$$

$$s_{i,j}(Z_{i,j}) + |b_{i,j}^1(Z_{i,j})| \frac{Z_{i+1,j} - 2Z_{i,j} + Z_{i-1,j}}{2\Delta} +$$

$$|b_{i,j}^2(Z_{i,j})| \frac{Z_{i,j+1} - 2Z_{i,j} + Z_{i,j-1}}{2\Delta}.$$

EQ. 2.29 can be written as an iterative equation as follows:

$$z_{i,j}^{r+1} = \left( |b_{i,j}^1(Z_{i,j}^r)| Z_{i-\operatorname{sgn}(b_{i,j}^1(Z_{i,j}^r)),j}^r + |b_{i,j}^2(Z_{i,j}^r)| Z_{i,j-\operatorname{sgn}(b_{i,j}^2(Z_{i,j}^r))}^r + \qquad \text{EQ. 2.30} \right.$$

$$\left. s_{i,j}(z_{i,j}^r)\Delta \right) \frac{1}{|b_{i,j}^1(Z_{i,j}^r)| + |b_{i,j}^2(Z_{i,j}^r)|}$$

which is well-posed due to observation R1 that guarantees that the existence of the denominator in EQ. 2.30 does not involve any difficulty.

Results

The embodiments described in this Example have been employed to two different scenarios.

In a first scenario real depth data were obtained from a structured light range scanner. Radiance images were then synthesized using the scanned mannequin face with virtual point light sources taking the nonlinear light attenuation described above into consideration. A nonuniform synthetic albedo was added to the object and simulated Gaussian noise was added to the radiance images.

Figure 17A:
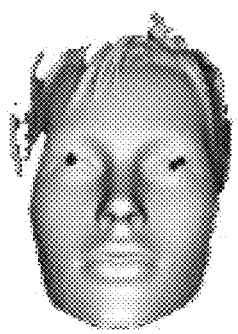
Figure 17E:
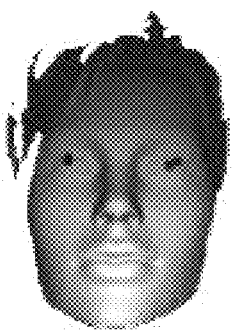
Figure 17I:
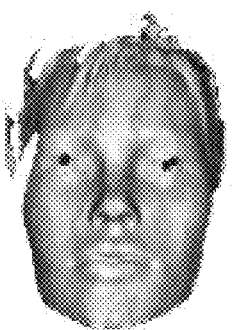
Figure 17B:
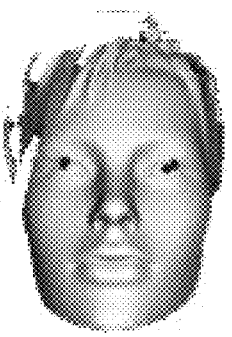
Figure 17F:
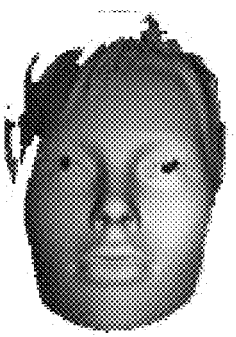
Figure 17J:
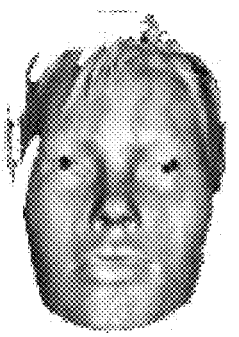
Figure 17C:
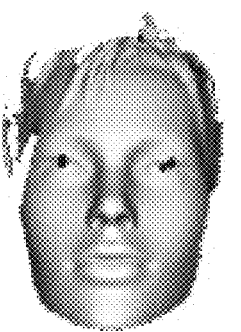
Figure 17G:
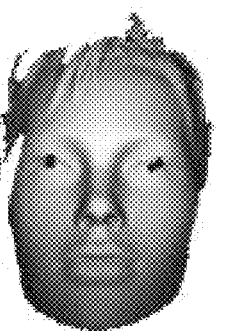
Figure 17K:
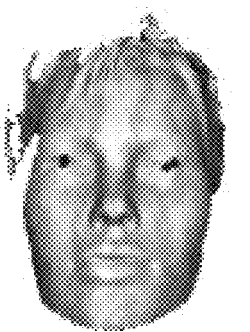
Figure 17D:
Figure 17H:
Figure 17L:

Three different experiments were performed. The synthetic images and reconstructed surfaces are shown in FIGS. 17A-17L, where FIGS. 17A-D correspond to a first experiment, FIGS. 17E-H correspond to a second experiment, and FIGS. 17I-L correspond to a third experiment. The first experiment included synthetic images with no noise (FIG. 17A), no strong light attenuation (FIG. 17B) and uniform albedo (FIG. 17C); the second experiment included synthetic images with no noise (FIG. 17E), strong light attenuation (FIG. 17F) and uniform albedo (FIG. 17G); and the third experiment included synthetic images with noise (FIG. 17I), no strong attenuation (FIG. 17J) and non-uniform albedo (FIG. 17K). The reconstructed surfaces obtained during the first, second and third experiments are shown in FIGS. 17D, 17H and 17L, respectively.

In a second scenario, a low cost endoscopic camera was employed. The camera was synchronized to three individually controlled low power white SMD light sources with fixed known positions and a real radial attenuation parameter of approximately $r_a=1$. Images of three objects which are approximately Lambertian were captured. The objects were a set of small artificial stairs, a tip of a thumb, and a palm of a hand. The reconstructions of these objects are shown in FIGS. 18A-C. As shown, good reconstructions of the thumb and hand have been achieved (FIGS. 18B and 18C, respectively). The starting images (FIG. 18A) were very noisy and were taken by quite far with respect to the endoscopic scenario.

The intrinsic camera parameters for the low cost endoscopic camera were found using the Bouget calibration toolbox and all images had the effect of lens distortion removed using the same toolbox. Subsequently the value of the focal length was set to 1 for all experiments and ξ and η were defined over a grid matching the field of view of the camera. The numerical schemes were all implemented in Matlab® MEX files in unoptimized C++ and executed in Matlab® using a single core of a 2012 Intel® Core i7 2.3 GHz MacBook Pro. For this work the parallelism available to an implementation of the integration strategy has not been utilized. Run-time for a 640×480 image was approximately 1 second for four iterations of the update scheme.

The experimental setup permits measuring the distance to a point on the surface to use as an initial seed point as required by the integration strategy. Alternatively, a static laser point or laser line can be attached to the endoscope and calibrated to automatically provide a set of true depth coordinates for use as seed points.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of processing a set of endoscopic images of a scene, the set being represented by a plurality of picture-elements defining an image plane, the images being characterized by different light intensity spatial distributions but the same viewpoint relative to the scene, the method comprising:
obtaining a depth of a location in the scene corresponding to a seed picture-element;
for each picture-element of at least some picture-elements other than said seed picture-element, using a data processor for associating a depth to said picture-element based on a depth associated with a neighbor picture-element, independently selecting a direction parallel to the image plane, constructing a weighted vector field based on said selected direction and said associated depth, and calculating a height of a surface in the scene perpendicular to the image plane based on said constructed weighted vector field; and
using said data processor for reconstructing a three-dimensional spatial representation of said surface based on said heights.

2. The method according to claim 1, wherein said weighted vector field is calculated according to a parameterization which is non-linear with respect to said depth.

3. The method according to claim 1, wherein said weighted vector field is calculated according to a parameterization which is reciprocally proportional to said depth.

4. The method according to claim 1, further comprising correcting an intensity value of said picture-element for light attenuation.

5. The method according to claim 4, wherein said correction comprises calculating a light attenuation coefficient, and multiplying said intensity value by said light attenuation coefficient.

6. The method according to claim 1, wherein said surface is partially obstructed in at least one image of the set, and wherein said selection of said direction comprises identifying a picture-element adjacent to an obstruction and selecting a tangential direction to said obstruction for said identified picture-element.

7. The method according to claim 1, wherein said selection of said direction comprises selecting a direction pointing from said picture-element to a neighbor picture-element that has not yet been visited by the method.

8. The method according to claim wherein said constructing said weighted vector field, comprising:
calculating vectors for pairs of images of said set, thereby providing a set of candidate vectors;
selecting from said set of candidate vectors a pair of vectors that are more orthogonal to each other than at least one other pair of candidate vectors; and
calculating said weighted vector field based on said selected direction and based on said selected pair of vectors.

9. The method according to claim 1, wherein said picture-element is selected dynamically along an expanding wavefront.

10. The method according to claim 1, wherein said calculation of said height is according to a forward numerical scheme.

11. The method according to claim 1, further comprising constructing a three-dimensional map of the scene based on said spatial representation.

12. A method of imaging, comprising:
using an endoscope for successively illuminating a scene from a plurality of positions;
acquiring, from the same viewpoint, at least one image of said scene at each illumination of the surface, thereby providing a set of images of a scene; and
executing the method according to claim 1.

13. A computer software product f r image processing, the computer software product comprising a non-volatile memory medium readable by a data processor, said memory medium storing program instructions, which, when read by said data processor, cause the data processor to receive a set of execute the method according to claim 1.

14. A system for imaging, comprising:
an endoscope mounted with an illumination system configured for illuminating a scene from a plurality of positions, and an image sensor for acquiring, from the same viewpoint, at least one image of said scene at each illumination of the surface, thereby providing a set of images of a scene; and
a data processor having an electronic circuit and a non-volatile memory medium readable by said circuit, wherein said memory medium stores program instructions which, when read by said circuit, cause said circuit:

to receive said set of images;
to obtain a depth of a location in the scene corresponding to a seed picture, element;
to associate a depth to each picture-element of at least some picture-elements other than said seed picture-element, based on a depth associated with a neighbor picture-element;
to independently select a direction parallel to the image plane;
to construct a weighted vector field based on said selected direction and said associated depth;
to calculate a height of a surface in the scene perpendicular to the image plane based on said constructed weighted vector field; and
to reconstruct a three-dimensional spatial representation of said surface based on said heights.

15. A method of processing a set of images of a scene, the set being represented by a plurality of picture-elements defining an image plane, the images being characterized by different light intensity spatial distributions but the same viewpoint relative to the scene, the method comprising:
for each of at least some picture-elements, using a data processor for independently selecting a direction parallel to the image plane, constructing a weighted vector field based on said selected direction, and calculating a height of a surface in the scene perpendicular to the image plane based on said constructed weighted vector field; and
using said data processor for reconstructing a three-dimensional spatial representation of said surface based on said heights;
wherein said surface is partially obstructed in at least one image of the set, and wherein said selection of said direction comprises identifying a picture-element adjacent to an obstruction and selecting a tangential direction to said obstruction for said identified picture-element.

16. The method according to claim 15, wherein said selection of said direction comprises selecting a direction pointing from said picture-element to a neighbor picture-element that has not yet been visited by the method.

17. The method according to claim 15, wherein said constructing said weighted vector field, comprising:
calculating vectors for pairs of images of said set, thereby providing a set of candidate vectors;
selecting from said set of candidate vectors a pair of vectors that are more orthogonal to each other than at least one other pair of candidate vectors; and
calculating said weighted vector field based on said selected direction and based on said selected pair of vectors.

18. The method according to claim 15, wherein said picture-element is selected dynamically along an expanding wavefront.

19. The method according to claim 15, wherein said calculation of said height is according to a forward numerical scheme.

20. The method according to claim 15, further comprising constructing a three-dimensional map of the scene based on said spatial representation.

21. The method according to claim 15, further comprising comparing said three-dimensional spatial representation to a reference spatial representation, and identifying said surface based on said comparison.

22. The method according to claim 21, wherein said surface is a surface of a face of an individual.

23. A method of imaging, comprising:
successively illuminating a scene from a plurality of positions;
acquiring, from the same viewpoint, at least one image of said scene at each illumination of the surface, thereby providing a set of images of a scene; and
executing the method according to claim 15.

24. The method according to claim 15, wherein said set of images is a set of scenery images.

25. The method according to claim 15, wherein said set of images is a set of endoscopic images.

26. A method of inspecting a surface of an object, comprising imaging the surface of the object by the method of claim 23, and analyzing said three-dimensional spatial representation thereby inspecting the surface of the object.

27. A computer software product for image processing, the computer software product comprising a non-volatile memory medium readable by a data processor, said memory medium storing program instructions, which, when read by said data processor, cause the data processor to receive a set of images and execute the method according to claim 15.

28. A system for imaging, comprising:
an illumination system for illuminating a scene from a plurality of positions;
an image sensor for acquiring, from the same viewpoint, at least one image of said scene at each illumination of the surface, thereby providing a set of images of a scene; and
a data processor having an electronic circuit and a non-volatile memory medium readable by said circuit, wherein said memory medium stores program instructions which, when read by said circuit, cause said circuit to:
receive said set of images;
to independently select a direction parallel to the image plane;
to construct a weighted vector field based on said selected direction;
to calculate a height of a surface in the scene perpendicular to the image plane based on said constructed weighted vector field; and
to reconstruct a three-dimensional spatial representation of said surface based on said heights;
wherein said picture-element is selected dynamically along an expanding wavefront.

29. The system according to claim 28, wherein said illumination system and said image sensor are mounted on an endoscope.

30. A portable device, comprising a system for imaging, which is the system of claim 28.

31. The portable device of claim 30, being selected from the group consisting of a cellular phone, a smartphone, a tablet device, a mobile digital camera, a wearable camera, a portable media player, a portable gaming device, a portable digital assistant device, and a portable navigation device.

32. A method of processing a set of images of a scene, the set being represented by a plurality of picture-elements defining an image plane, the images being characterized by different light intensity spatial distributions but the same viewpoint relative to the scene, the method comprising:
for each of at least some picture-elements, using a data processor for independently selecting a direction parallel to the image plane, constructing a weighted vector field based on said selected direction, and calculating a height of a surface in the scene perpendicular to the image plane based on said constructed weighted vector field; and using said data processor for reconstructing a three-dimensional spatial representation of said surface based on said heights;

wherein said constructing said weighted vector field, comprising:

calculating vectors for pairs of images of said set, thereby providing a set of candidate vectors;

selecting from said set of candidate vectors a pair of vectors that are more orthogonal to each other than at least one other pair of candidate vectors; and calculating said weighted vector field based on said selected direction and based on said selected pair of vectors.

33. A method of processing a set of images of a scene, the set being represented by a plurality of picture-elements defining an image plane, the images being characterized by different light intensity spatial distributions but the same viewpoint relative to the scene, the method comprising:

for each of at least some picture-elements, using a data processor for independently selecting a direction parallel to the image plane, constructing a weighted vector field based on said selected direction, and calculating a height of a surface in the scene perpendicular to the image plane based on said constructed weighted vector field; and using said data processor for reconstructing a three-dimensional spatial representation of said surface based on said heights;

wherein said picture-element is selected dynamically along an expanding wavefront.

* * * * *